(12) United States Patent
Sakhnini et al.

(10) Patent No.: US 12,477,620 B2
(45) Date of Patent: Nov. 18, 2025

(54) CUSTOMIZABLE CONNECTED MODE DISCONTINUOUS RECEPTION

(71) Applicant: QUALCOMM Incorporated, San Diego, CA (US)

(72) Inventors: Iyab Issam Sakhnini, San Diego, CA (US); Diana Maamari, San Diego, CA (US); Tao Luo, San Diego, CA (US); Prashanth Haridas Hande, San Diego, CA (US); Wanshi Chen, San Diego, CA (US); Peter Gaal, San Diego, CA (US); Linhai He, San Diego, CA (US); Jelena Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 420 days.

(21) Appl. No.: 17/819,613

(22) Filed: Aug. 12, 2022

(65) Prior Publication Data

US 2024/0057206 A1 Feb. 15, 2024

(51) Int. Cl.
*H04W 76/28* (2018.01)
*H04L 5/00* (2006.01)
*H04W 72/23* (2023.01)

(52) U.S. Cl.
CPC .......... *H04W 76/28* (2018.02); *H04L 5/0048* (2013.01); *H04W 72/23* (2023.01)

(58) Field of Classification Search
CPC ..................................................... H04W 76/28
See application file for complete search history.

(56) References Cited

U.S. PATENT DOCUMENTS

| | | | |
|---|---|---|---|
| 2017/0208521 A1* | 7/2017 | Wu | H04W 36/305 |
| 2018/0132186 A1* | 5/2018 | Kumar | H04W 52/0261 |
| 2019/0037495 A1* | 1/2019 | John Wilson | H04W 56/001 |
| 2020/0252875 A1* | 8/2020 | Qiu | H04W 52/0248 |
| 2022/0110059 A1* | 4/2022 | Xue | H04W 52/0235 |
| 2023/0066448 A1* | 3/2023 | Tseng | H04W 72/20 |
| 2023/0232326 A1* | 7/2023 | Gummadi | H04W 52/0229 370/311 |
| 2024/0251461 A1* | 7/2024 | Palenius | H04W 88/06 |
| 2024/0276520 A1* | 8/2024 | Huang | H04L 1/1812 |

* cited by examiner

*Primary Examiner* — Jason E Mattis
(74) *Attorney, Agent, or Firm* — Arent Fox, LLP

(57) ABSTRACT

Example implementations include a method, apparatus and computer-readable medium of wireless communication by a user equipment, comprising receiving at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. The implementations further include transmitting data based on performance of one or more UE operations of the subset of UE operations during the second C-DRX cycle.

30 Claims, 24 Drawing Sheets

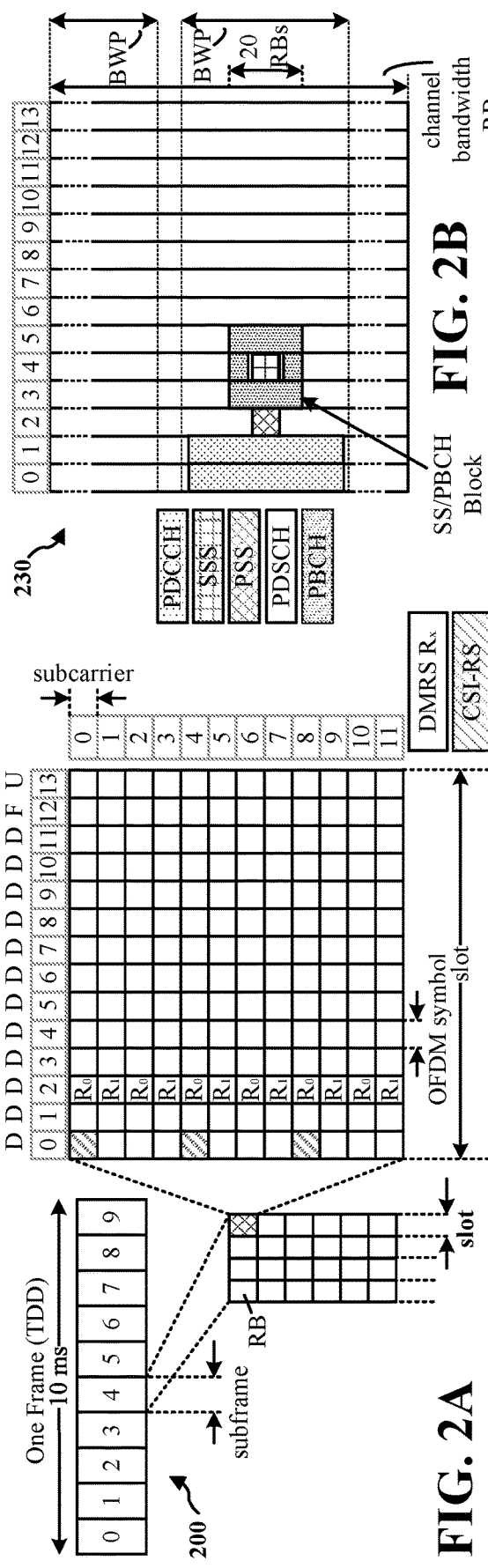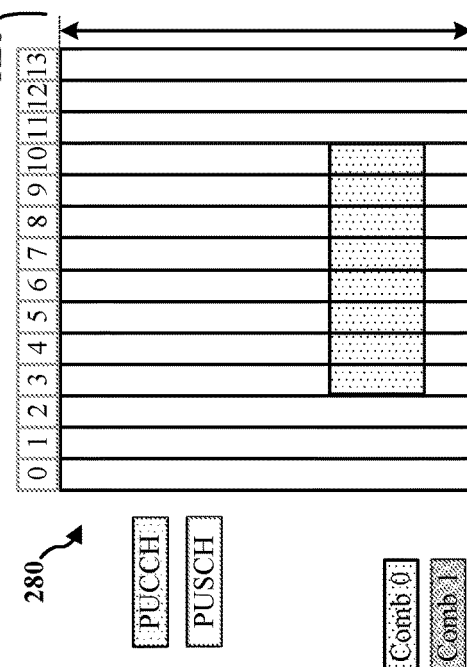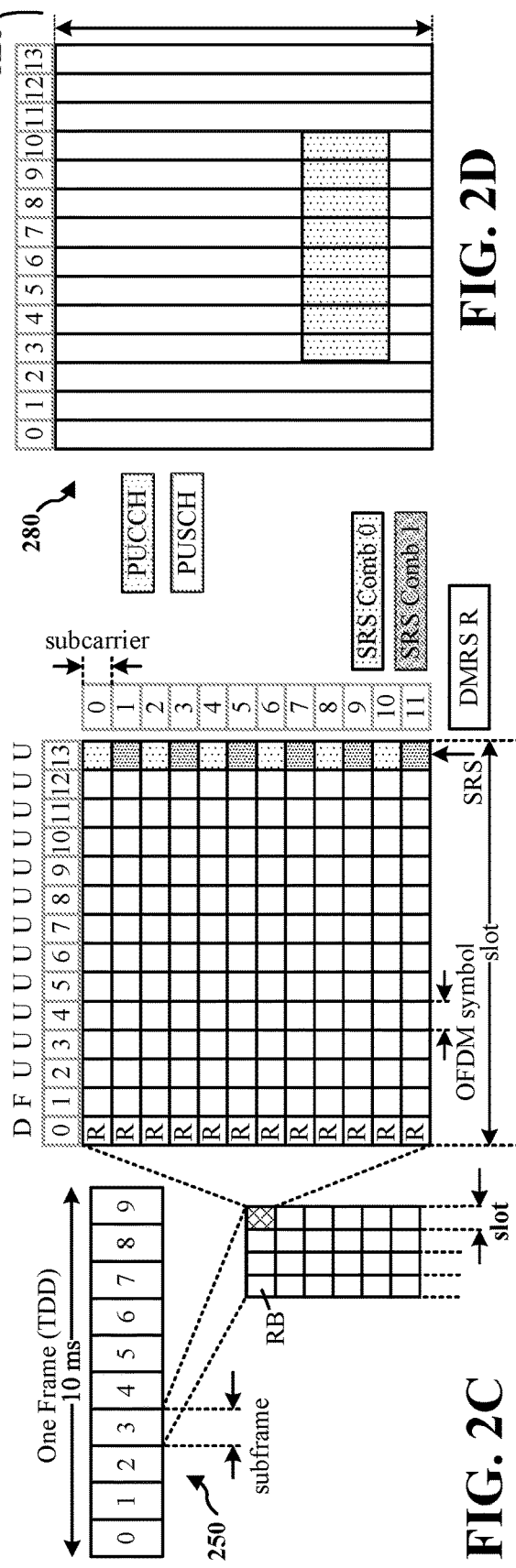
FIG. 2A  FIG. 2B  FIG. 2C  FIG. 2D

800

802

Receiving at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations

804

Transmitting data based on performance of one or more UE operations of the subset of UE operations during the second C-DRX cycle

Refraining from monitoring a physical downlink control channel (PDCCH) during an active time of the second C-DRX cycle

Refraining from monitoring a UE specific search space (USS) during the second C-DRX cycle

Receiving an updated configuration associated with the second C-DRX cycle, where at least one of a parameter value of the second C-DRX cycle or the subset of UE operations are modified based on the updated configuration

Receiving an updated configuration associated with the first CDRX cycle, where at least one of a parameter value of the second CDRX cycle or the subset of UE operations are modified based on the updated configuration

Updating a start time of an active time for the second C-DRX cycle based on the start time indicated in the updated configuration

Updating a start time of an active time for the second CDRX cycle based on the end time indicated in the updated configuration

Transmitting second data based on performance of one or more UE operations of the subset of UE operations during the third C-DRX cycle, where the one or more UE operations of the subset of UE operations are performed during the third C-DRX cycle based on an active time of the second C-DRX cycle overlapping with an active time of the third C-DRX cycle

Transmitting at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations

1804

Receiving data associated with one or more UE operations of the subset of UE operations during the second C-DRX cycle

Transmitting an updated configuration associated with the second C-DRX cycle, where at least one of a parameter value of the second C-DRX cycle or the subset of UE operations are modified based on the updated configuration

Receiving a request for an updated configuration associated with the second C-DRX cycle, where the request indicates a modification for at least one of a parameter value of the second C-DRX cycle or the subset of UE operations

2004

In response to the request, transmitting the updated configuration

Transmitting an updated configuration associated with the first C-DRX cycle, where at least one of a parameter value of the second C-DRX cycle or the subset of UE operations are modified based on the updated configuration

Receiving second data associated with one or more UE operations of the subset of UE operations during a third C-DRX cycle, based on an active time of the second C-DRX cycle overlapping with an active time of the third C-DRX cycle

FIG. 22

CUSTOMIZABLE CONNECTED MODE DISCONTINUOUS RECEPTION

BACKGROUND

Technical Field

The present disclosure generally relates to communication systems, and more particularly, to connected mode discontinuous reception (C-DRX).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology. These improvements may also be applicable to other multi-access technologies and the telecommunication standards that employ these technologies. For instance, improvements to efficiency and latency relating to mobility of user equipments (UEs) communicating with network entities are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communication at a user equipment. In some examples, the method includes receiving at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Additionally, in some examples, the method further includes transmitting data based on performance of one or more UE operations of the subset of UE operations during the second C-DRX cycle.

Certain aspects are directed to a method for wireless communication at a network entity. In some examples, the method includes transmitting at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Additionally, in some examples, the method further includes receiving data based on performance of one or more UE operations of the subset of UE operations during the second C-DRX cycle.

Certain aspects are directed to an apparatus configured for wireless communication, comprising a processor, a memory coupled with the processor, and instructions stored in the memory, when executed by the processor, cause the apparatus to receive at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. In some examples, the instructions, when executed by the processor, further cause the apparatus to transmit data based on performance of one or more UE operations of the subset of UE operations during the second C-DRX cycle.

Certain aspects are directed to an apparatus configured for wireless communication, comprising a processor, a memory coupled with the processor, and instructions stored in the memory, when executed by the processor, cause the apparatus to transmit at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. In some examples, the instructions, when executed by the processor, further cause the apparatus to receive data based on performance of one or more UE operations of the subset of UE operations during the second C-DRX cycle.

Certain aspects are directed to a non-transitory computer-readable medium having instructions stored thereon that, when executed by an apparatus, cause the apparatus to perform operations comprising receiving at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Additionally, in some examples, the operations include transmitting data based on performance of one or more UE operations of the subset of UE operations during the second C-DRX cycle.

Certain aspects are directed to a non-transitory computer-readable medium having instructions stored thereon that, when executed by an apparatus, cause the apparatus to perform operations comprising transmitting at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Additionally, in some examples, the operations include receiving data based on performance of one or more UE operations of the subset of UE operations during the second C-DRX cycle.

Certain aspects are directed to an apparatus for wireless communication. In some examples, the apparatus includes means for receiving at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Additionally, in some examples, the apparatus includes means for transmitting data based on performance of one or more UE operations of the subset of UE operations during the second C-DRX cycle.

Certain aspects are directed to an apparatus for wireless communication. In some examples, the apparatus includes means for transmitting at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Additionally, in some examples, the apparatus includes means for receiving data based on performance of one or more UE operations of the subset of UE operations during the second C-DRX cycle.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 8 is a flowchart of a method of wireless communication.

FIG. 9 is a flowchart of a method of wireless communication.

FIG. 10 is a flowchart of a method of wireless communication.

FIG. 11 is a flowchart of a method of wireless communication.

FIG. 13 is a flowchart of a method of wireless communication.

FIG. 14 is a flowchart of a method of wireless communication.

FIG. 15 is a flowchart of a method of wireless communication.

FIG. 16 is a flowchart of a method of wireless communication.

FIG. 18 is a flowchart of a method of wireless communication.

FIG. 19 is a flowchart of a method of wireless communication.

FIG. 20 is a flowchart of a method of wireless communication.

FIG. 21 is a flowchart of a method of wireless communication.

FIG. 22 is a flowchart of a method of wireless communication.

DETAILED DESCRIPTION

Figure 1A:
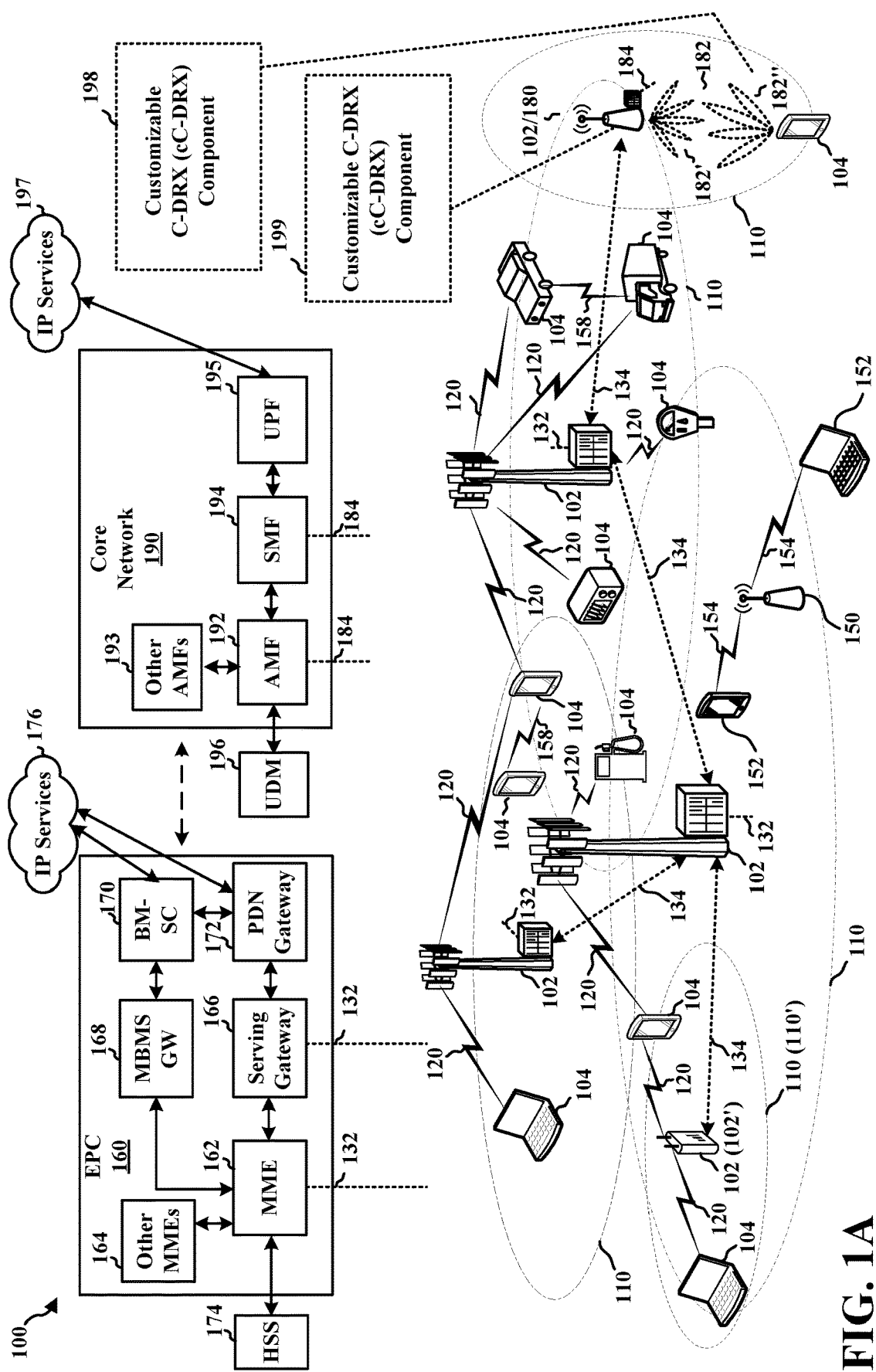
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Extended reality (XR) traffic may include virtual reality, augmented reality, and/or mixed reality traffic, and may generally have different characteristics from eMBB traffic or URLLC traffic. For example, XR traffic may have variable packet size and/or number of packets, non-integer cycle periods, include jitter, may include multiple traffic flows, and can be highly sensitive to latency. Some techniques for handling XR traffic or traffic with characteristics of XR traffic increase power consumption by a User Equipment (UE) and/or cause the UE to perform inefficiently.

XR traffic may have a time jitter in its arrival as well as a tempo mismatch with connected mode (C-DRX) cycles. In order to address this mismatch, multiple proposals have been considered, including non-uniform C-DRX cycles, or enhanced C-DRX, and dynamically changing C-DRX parameters using either a wake up signal (WUS) or downlink control information (DCI). However, due to these non-uniform C-DRX cycles, in order to accommodate XR traffic, some periodic messages that the network entity may generally send to the UE, such as PDCCH in search space sets, CSI-RS, or other signals, may end up falling outside this C-DRX active time and hence may cause delays in wireless communication.

One approach to resolve this issue, is to include multiple C-DRX configurations, where each C-DRX configuration may be associated with a different period. This may include a configuration covering both a non-uniform C-DRX for receiving XR traffic, and a uniform periodic period for receiving other messages such as PDCCH and CSI-RS. However, applying two C-DRX cycles in this manner may result in increased power consumption unnecessarily. Therefore, it would be beneficial to have a C-DRX configuration for CSI-RS occasions in terms of reusing an existing configuration of a C-DRX in order to customize a UE's operations within such C-DRX cycle. It would also be helpful and efficient to have customizable C-DRX configurations, where certain operations of the UE maybe allowed while other operations of the UE may be restricted.

Accordingly, techniques described herein provide customizable C-DRX (cC-DRX) configurations which allow a UE to more efficiently handle XR traffic, or other types of traffic unrelated to XR, while reducing power consumption and increasing its operational efficiency. Additional details of these techniques are described herein with respect to FIGS. 5A-22.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system 100 (also referred to as a wireless wide area network (WWAN)) that includes base stations 102 (also referred to herein as network entities), user equipment(s) (UE) 104, an Evolved Packet Core (EPC) 160, and another core network 190 (e.g., a 5G Core (5GC)).

One or more of the UE 104 may include an customizable C-DRX (cC-DRX) component 198, and one or more of the base stations 102/180 may be configured to include an cC-DRX component 199, wherein the cC-DRX component 198 and the cC-DRX component 199 are operable to reduce power consumption and/or increase power management efficiency of UE 104.

Figure 6:
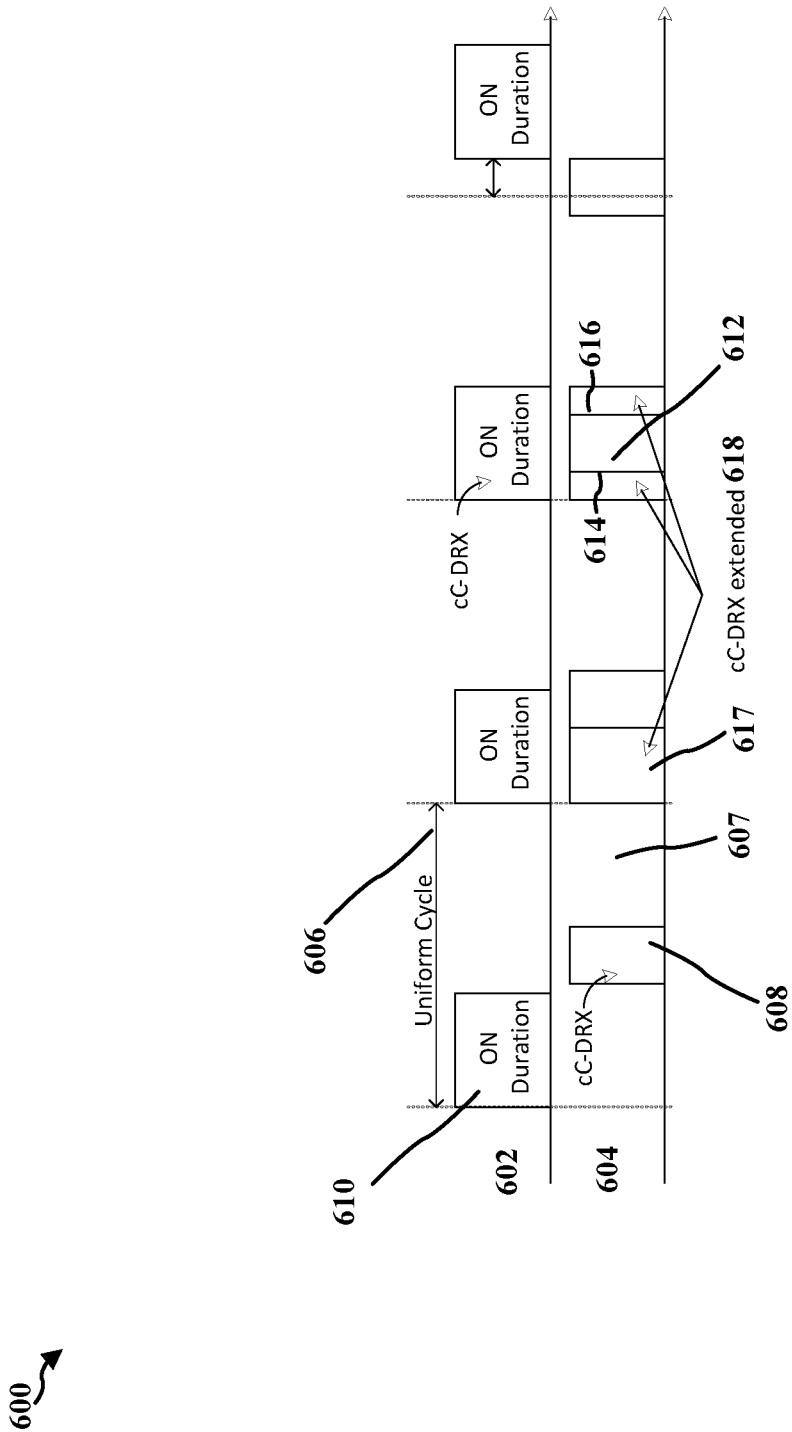
FIG. 6 is a diagram illustrating an yet another example C-DRX cycle and a cC-DRX cycle, in accordance with various aspects of the present disclosure.
Figure 7:
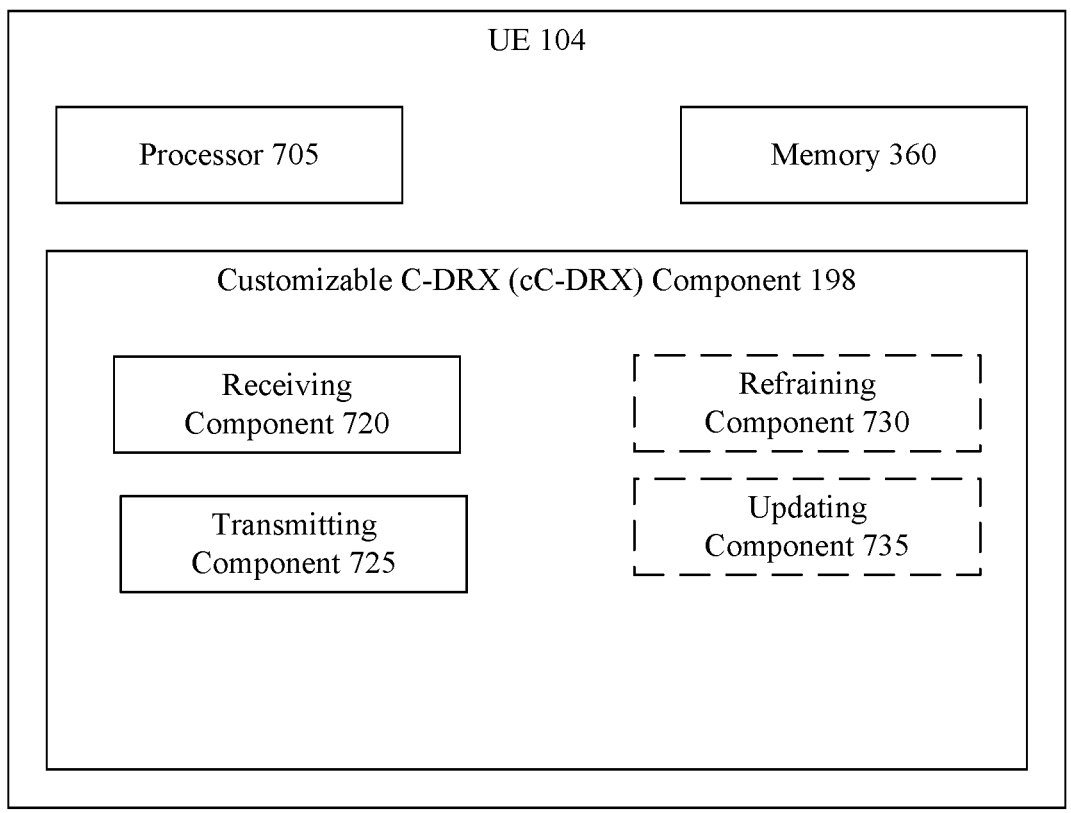
FIG. 7 is a diagram illustrating an example of a hardware implementation for an example apparatus.

At one or more of the UEs 104, and additionally referring to FIG. 7, the cC-DRX component 198 includes a receiving component 720 configured to receive at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Further, the cC-DRX component 198 includes a transmitting component 725 configured to transmit data based on performance of one or more UE operations of the subset of UE operations during the second C-DRX cycle. Also, in some optional or additional aspects, the cC-DRX component 198 includes refraining component 730 and/or updating component 735. Additional details of the cC-DRX component 198 and/or any of the foregoing components are provided below, for example, with reference to FIGS. 5A-16.

Figure 17:
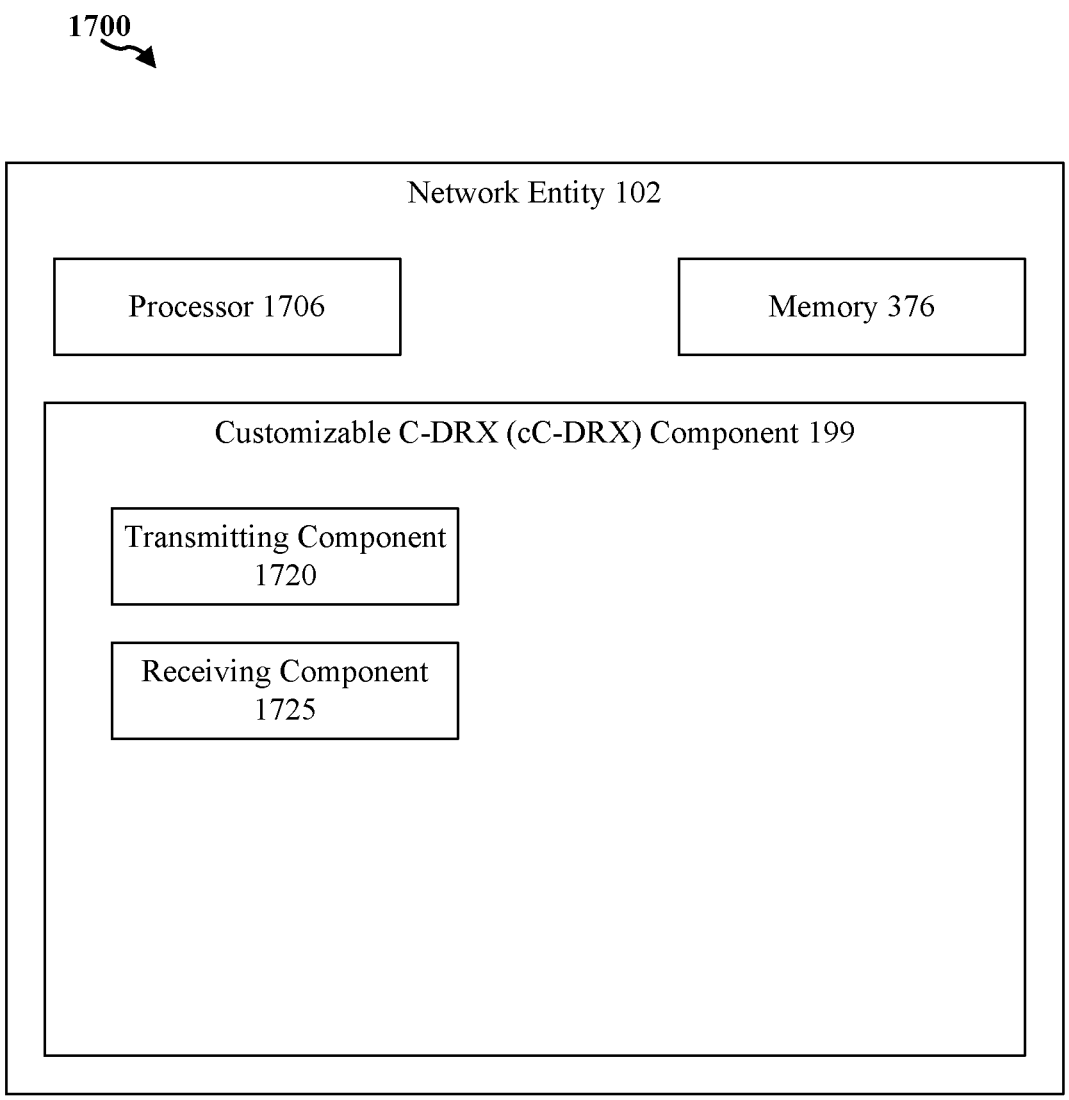
FIG. 17 is a diagram illustrating another example of a hardware implementation for another example apparatus.

At one or more of the base stations 102/180 (or, network entities), and additionally referring to FIG. 17, the cC-DRX component 199 includes a transmitting component 1720 configured to transmit at least one configuration associated with a plurality of connected mode discontinuous reception (C-DRX) cycles, wherein a first C-DRX cycle of the plurality of C-DRX cycles is associated with a set of user equipment (UE) operations and a second C-DRX cycle of the plurality of C-DRX cycles is associated with a subset of UE operations of the set of UE operations. Further, the cC-DRX component 199 includes a receiving component 1725 configured to transmit data based on performance of one or more UE operations of the subset of UE operations during the second C-DRX cycle. Additional details of the cC-DRX component 199 and/or any of the foregoing components are provided below, for example, with reference to FIGS. 5A-6, and 17-22.

The base stations (or network entities) 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Any of the disaggregated components in the D-RAN and/or O-RAN architectures may be referred to herein as a network entity.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a network entity, gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 1B:
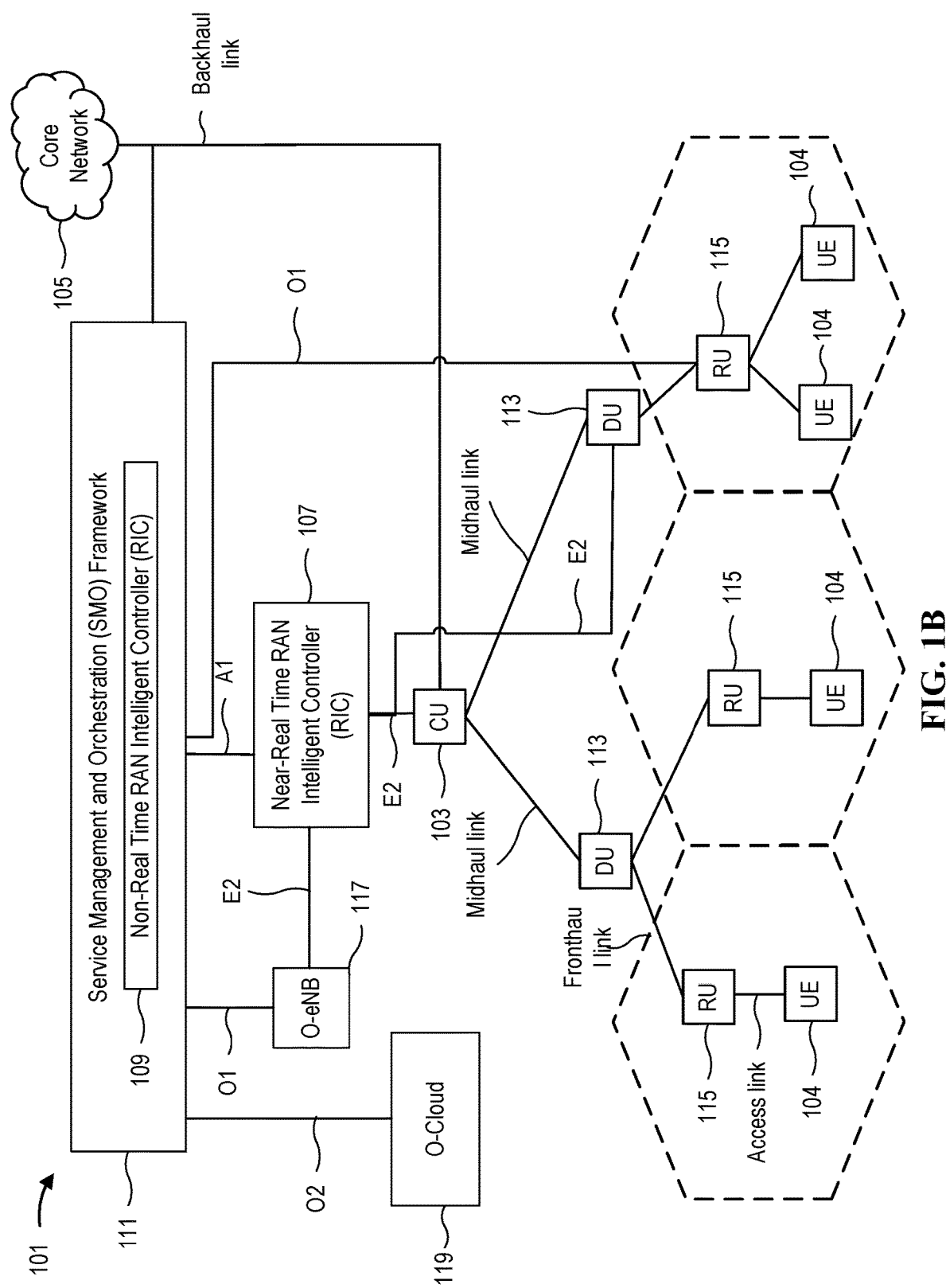
FIG. 1B is a diagram illustrating an example of disaggregated base station architecture, in accordance with various aspects of the present disclosure.

FIG. 1B is a diagram illustrating an example of disaggregated base station 101 architecture, any component or element of which may be referred to herein as a network entity. The disaggregated base station 101 architecture may include one or more central units (CUs) 103 that can communicate directly with a core network 105 via a backhaul link, or indirectly with the core network 105 through one or more disaggregated base station units (such as a Near-Real Time (Near-RT) RAN Intelligent Controller (RIC) 107 via an E2 link, or a Non-Real Time (Non-RT) RIC 109 associated with a Service Management and Orchestration (SMO) Framework 111, or both). A CU 103 may communicate with one or more distributed units (DUs) 113 via respective midhaul links, such as an F1 interface. The DUs 113 may communicate with one or more radio units (RUs) 115 via respective fronthaul links. The RUs 115 may communicate with respective UEs 104 via one or more radio frequency (RF) access links. In some implementations, the UE 104 may be simultaneously served by multiple RUs 115.

Each of the units, e.g., the CUs 103, the DUs 113, the RUs 115, as well as the Near-RT RICs 107, the Non-RT RICs 109 and the SMO Framework 111, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 103 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 103. The CU 103 may be configured to handle user plane functionality (i.e., Central Unit-User Plane (CU-UP)), control plane functionality (i.e., Central Unit-Control Plane (CU-CP)), or a combination thereof. In some implementations, the CU 103 can be logically split into one or more CU-UP units and one or more CU-CP units. The CU-UP unit can communicate bidirectionally with the CU-CP unit via an interface, such as the E1 interface when implemented in an O-RAN configuration. The CU 103 can be implemented to communicate with the DU 113, as necessary, for network control and signaling.

The DU 113 may correspond to a logical unit that includes one or more base station functions to control the operation of one or more RUs 115. In some aspects, the DU 113 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 113 may further host one or more low PHY layers. Each layer (or module) can be implemented with an interface configured to communicate signals with other layers (and modules) hosted by the DU 113, or with the control functions hosted by the CU 103.

Lower-layer functionality can be implemented by one or more RUs 115. In some deployments, an RU 115, controlled by a DU 113, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 115 can be implemented to handle over the air (OTA) communication with one or more UEs 104. In some implementations, real-time and non-real-time aspects of control and user plane communication with the RU(s) 115 can be controlled by the corresponding DU 113. In some scenarios, this configuration can enable the DU(s) 113 and the CU 103 to be implemented in a cloud-based RAN architecture, such as a vRAN architecture.

The SMO Framework 111 may be configured to support RAN deployment and provisioning of non-virtualized and virtualized network elements. For non-virtualized network elements, the SMO Framework 111 may be configured to support the deployment of dedicated physical resources for RAN coverage requirements which may be managed via an operations and maintenance interface (such as an O1 interface). For virtualized network elements, the SMO Framework 111 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 103, DUs 113, RUs 115 and Near-RT RICs 107. In some implementations, the SMO Framework 111 can communicate with a hardware aspect of a 4G RAN, such as an open eNB (O-eNB) 117, via an O1 interface. Additionally, in some implementations, the SMO Framework 111 can communicate directly with one or more RUs 115 via an O1 interface. The SMO Framework 111 also may include a Non-RT RIC 109 configured to support functionality of the SMO Framework 111.

The Non-RT RIC 109 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 107. The Non-RT RIC 109 may be coupled to or communicate with (such as via an A1 interface) the Near-RT RIC 107. The Near-RT RIC 107 may be configured to include a logical function that enables near-real-time control and optimization of RAN elements and resources via data collection and actions over an interface (such as via an E2 interface) connecting one or more CUs 103, one or more DUs 113, or both, as well as an O-eNB, with the Near-RT RIC 107.

In some implementations, to generate AI/ML models to be deployed in the Near-RT RIC 107, the Non-RT RIC 109 may receive parameters or external enrichment information from external servers. Such information may be utilized by the Near-RT RIC 107 and may be received at the SMO Framework 111 or the Non-RT RIC 109 from non-network data sources or from network functions. In some examples, the Non-RT RIC 109 or the Near-RT RIC 107 may be configured to tune RAN behavior or performance. For example, the Non-RT RIC 109 may monitor long-term trends and patterns for performance and employ AI/ML models to perform corrective actions through the SMO Framework 111 (such as reconfiguration via 01) or via creation of RAN management policies (such as A1 policies).

FIGS. 2A-2D are diagrams of various frame structures, resources, and channels used by UEs 104 and base stations 102/180 for communication. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology 1.1=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
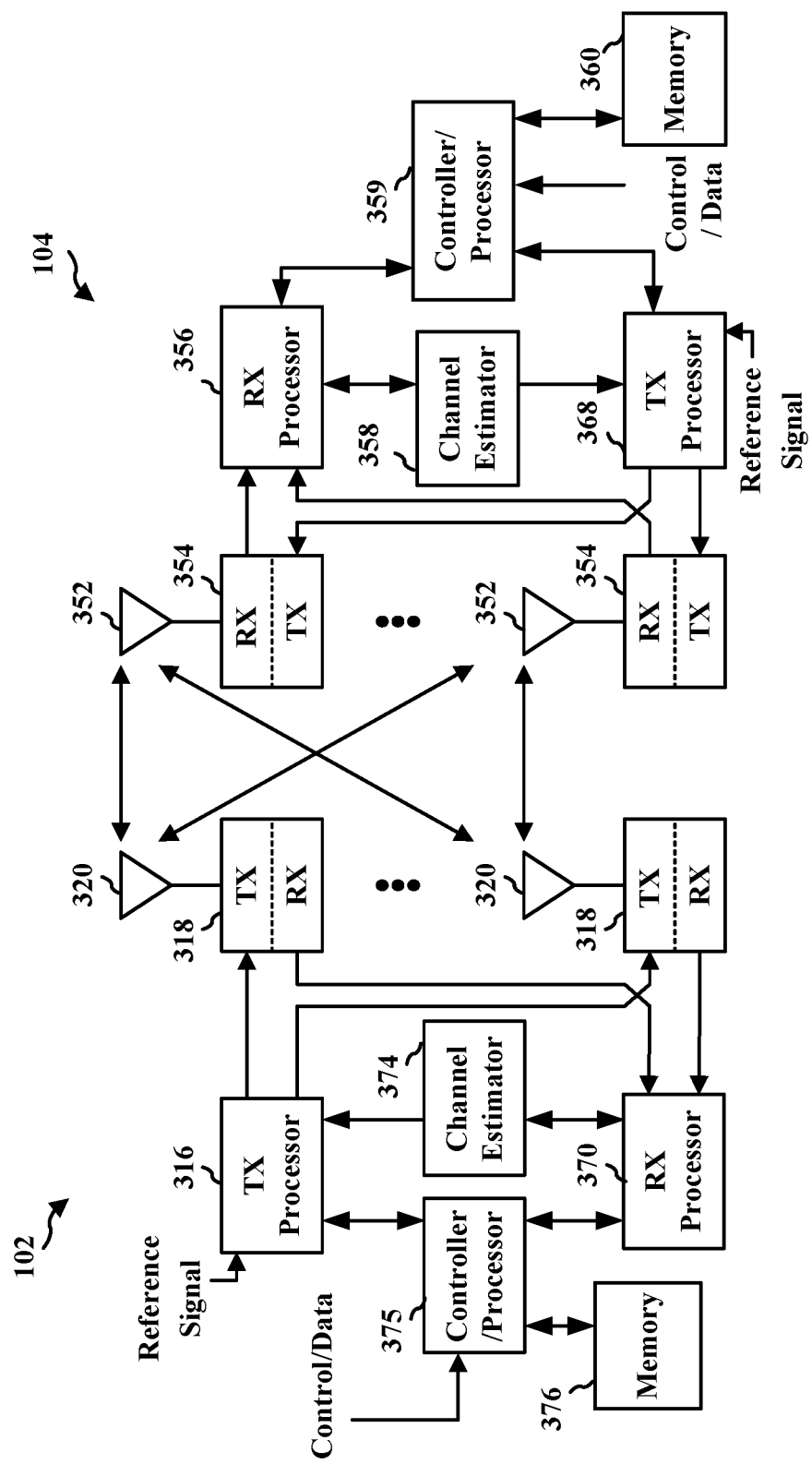
FIG. 3 is a diagram illustrating an example of a base station and user equipment (UE) in an access network.

FIG. 3 is a block diagram of hardware components of the base station 102 (or 180) in communication with the UE 104 in the wireless communication network 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TB s, demultiplexing of MAC SDUs from TB s, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with cC-DRX component 198 of FIG. 1A. For example, the memory 360 may include executable instructions defining the cC-DRX component 198. The TX processor 368, the RX processor 356, and/or the controller/processor 359 may be configured to execute the cC-DRX component 198.

At least one of the TX processor 316, the RX processor 370, and the controller/processor 375 may be configured to perform aspects in connection with cC-DRX component 199 of FIG. 1A. For example, the memory 376 may include executable instructions defining the cC-DRX component 199. The TX processor 316, the RX processor 370, and/or the controller/processor 375 may be configured to execute the cC-DRX component 199.

As described above, extended reality (XR) traffic may include virtual reality, augmented reality, and/or mixed reality traffic. XR traffic may generally have different characteristics from eMBB traffic or URLLC traffic. One such characteristic is its packet size or number of packets. Generally XR traffic includes a variability in the number and size of packets per burst. XR traffic may also include non-integer cycle periods. For example, XR traffic may have a non-integer cycle period because of the frames per second rate of video data, such as video data with 1/60 frames per second (fps) or 1/120 fps, which translates to 16.67 milliseconds period or 8.33 milliseconds period, respectively. XR traffic may typically include jitter which causes arrival times of XR traffic to vary. For example, jitter may cause the arrival time of an XR traffic burst to arrive within 4 milliseconds of a configured time before or after the configured time period. XR traffic may also include multiple flows, which may be configured with different configurations. An example might be a video flow and an audio flow. Additionally, XR traffic can be very sensitive to latency and has a very strict packet delay budget (PDB), which can cause XR traffic to not be retransmitted if it is missed. For example, for XR traffic including video flow may not be retransmitted at later time if a video frame is missed.

Figure 4:
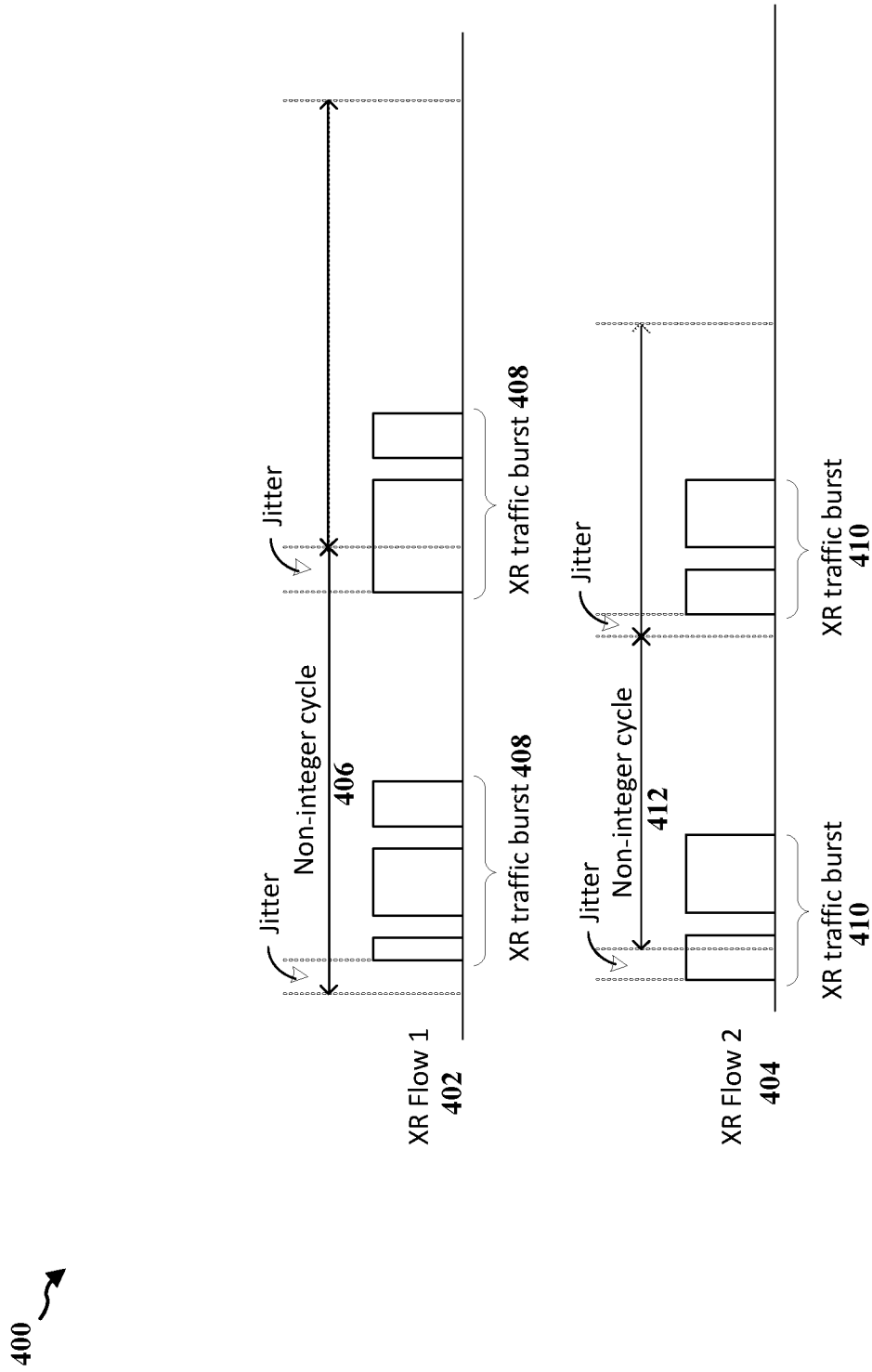
FIG. 4 is a diagram illustrating an example of extended reality (XR) traffic flow.

Referring to FIG. 4, example 400 shows an XR traffic burst in multiple flows. The example 400 includes a first XR flow 402 and a second XR flow 404. The first XR flow may include a non-integer cycle 406 of XR traffic bursts 408. The first XR flow may include jitter associated with each XR traffic burst, which may cause each XR traffic burst to arrive before or after a configured time of arrival. The second XR flow may also include multiple XR traffic bursts 410 and a non-integer cycle 412 with similar factors as XR flow one. The first XR flow 402, for example, may correspond to a video flow, while the second XR flow 404, for example, may correspond to an audio flow.

Currently, it would be helpful to identify XR traffic characteristics in uplink and downlink communication, quality of service (QoS) metrics, and application layer attributes beneficial for a base station (or network entity) to communicate with a UE using XR traffic. One such helpful factor would be XR specific power saving, which would involve configuring a periodicity, XR traffic flows, jitter, latency, reliability of XR traffic to result in power saving at the UE. To do this, it would be helpful to enhance a C-DRX of the UE in order to allow the UE to modify its on-durations according to the non-periodic XR traffic characteristics. It would also be helpful to enhance PDCCH monitoring, given that in XR traffic bursts, there may not be any reason to monitor for a PDCCH (e.g., if the bursts are semi-persistently scheduled or based on a configured grant).

Another aspect that would be helpful for XR improvements is in terms of capacity, where XR service characteristics such as periodicity, multiple flows, jitter, latency, reliability may all be improved based on modifications at the UE. One such modification may be an enhancement in semi persistent scheduling (SPS) and configured grant (CG) scheduling. Another factor maybe in terms of dynamic scheduling and dynamic grants enhancements in association with XR traffic.

XR traffic may have a time jitter in its arrival as well as a tempo mismatch with C-DRX cycles. In order to address this mismatch, multiple proposals have been considered, including non-uniform C-DRX cycles, or enhanced C-DRX, and dynamically changing C-DRX parameters using either a wake up signal (WUS) or downlink control information (DCI). These parameters may include, for example, on-duration start time, an inactivity timer, and the like. However, due to these non-uniform C-DRX cycles, in order to accommodate XR traffic, some periodic messages that the network entity may generally send to the UE, such as PDCCH in search space sets, CSI-RS, or other signals, may end up falling outside this C-DRX active time and hence may cause delays in wireless communication. One approach to resolve this issue, is to include multiple C-DRX configurations, where each C-DRX configuration may be associated with a different period. This may include a configuration covering both a non-uniform C-DRX for receiving XR traffic, and a uniform periodic period for receiving other messages such as PDCCH and CSI-RS. However, applying two C-DRX cycles in this manner may result in increased power consumption unnecessarily. For example, if the UE is intending to measure CSI-RS only in a periodic C-DRX cycle to account for the periodic messaging that an XR traffic may not consider, the UE may have to monitor search spaces in the C-DRX cycle. However, if it is desired for the UE to only measure CSI-RS, then monitoring the search space as well would result in unnecessary power consumption. Therefore, it would be beneficial to have a C-DRX configuration for CSI-RS occasions in terms of reusing an existing configuration of a C-DRX in order to customize a UE's operations within such C-DRX cycle.

In another example, in XR traffic, multiple flows may be considered, as previously described, for example, a video flow and an audio flow. These multiple flows may have multiple periods and/or burst lengths, and in some cases, may have different characteristics. For example, one flow may use dynamic grant scheduling, and therefore, requires PDCCH and search space set monitoring, while another flow may use semi persistent scheduling (SPS) or configured grant (CG) scheduling and may not require a configuration of a PDCCH or search space set. The general approach to account for both of these flows may include having two different C-DRX configurations, one for each flow. However, since the second flow may not require PDCCH monitoring, it would be helpful for that corresponding C-DRX cycle may be configured to not have search spaces. Instead, it may be configured to have CSI-RS measurements. However, current C-DRX cycles may not allow such selective configurations given their lack of customizability in terms of UE operations. Thus, the UE may end up monitoring PDCCH for the second flow even if it is more efficient to measure only CSI-RS for that second flow given its semi-persistent scheduling or CG nature. Therefore, it would be helpful and efficient to have customizable C-DRX configurations, where certain operations of the UE maybe allowed while other operations of the UE may be restricted.

The UE 104 may be configured to receive one or more configurations associated with multiple C-DRX cycles. At least one of the C-DRX cycles may be a customizable C-DRX cycle (cC-DRX cycle). As described herein, a C-DRX cycle will be referred to herein as a cC-DRX cycle when a configuration associated with that C-DRX cycle indicates only a limited number of UE operations that the UE can perform, and where the limited number of UE operations are a subset of UE operations that the UE 104 may generally be configured to perform during an active time of a normal C-DRX cycle (a non-customized C-DRX).

Examples of UE operations that the UE 104 may perform during a normal C-DRX cycle may include but are not limited to reception of CSI-RS, measurement of CSI-RS, reception of PDCCH, monitoring of a common search space (CSS) for the PDCCH, monitoring of UE specific search space (USS) for the PDCCH, and/or the like. A configuration of a cC-DRX cycle may only indicate performance of one or more of these UE operations during an active time of the cC-DRX cycle. For example, a configuration of a cC-DRX cycle may only indicate receiving a CSI-RS or a measurement of CSI-RS during the active time of the cC-DRX cycle. Similarly, a configuration of another cC-DRX may only indicate receiving PDCCH during the active time of the cC-DRX cycle. In yet other examples, a configuration of another cC-DRX cycle may only indicate that the UE 104 can monitor a CSS for the PDCCH. In yet another example, a configuration of yet another cC-DRX cycle may only indicate that the UE 104 can monitor USS for the PDCCH. A cC-DRX configuration may further include a limited number of one or more channels and/or signals that are typically allowed in a normal C-DRX cycle.

In one example, the UE 104 may only measure CSI-RS in an on-duration or active time of a cC-DRX cycle. For instance, the UE 104 may not monitor PDCCH. In contrast, in a normal C-DRX cycle, the UE 104 may monitor PDCCH in addition to measuring CSI-RS, wasting power. Thus, the cC-DRX may save power of the UE 104. In another example, the UE 104 may only monitor a common search space in a cC-DRX cycle during its on-duration or active time. For instance, the UE 104 may not monitor a user search space or measure CSI-RS during this cC-DRX cycle. As a result, the UE 104 may spend less power monitoring or measuring signals that may not be necessary for the UE 104 to measure. For instance, in a semi persistently scheduled configuration, a PDCCH may not be scheduled and thus there may not be a reason to have the UE 104 monitor for a user search space. Thus, the power of the UE 104 can be saved by configuring a cC-DRX cycle that does not require the UE 104 to make such an inefficient monitoring operation. The cC-DRX configurations may be defined using the same parameters as non-customizable C-DRX cycles or, as referred to herein throughout this disclosure, a normal C-DRX cycle. For instance, a cC-DRX cycle or configuration may include an on-duration, inactivity timer, and/or other such parameters associated with normal C-DRX cycles.

Figure 5A:
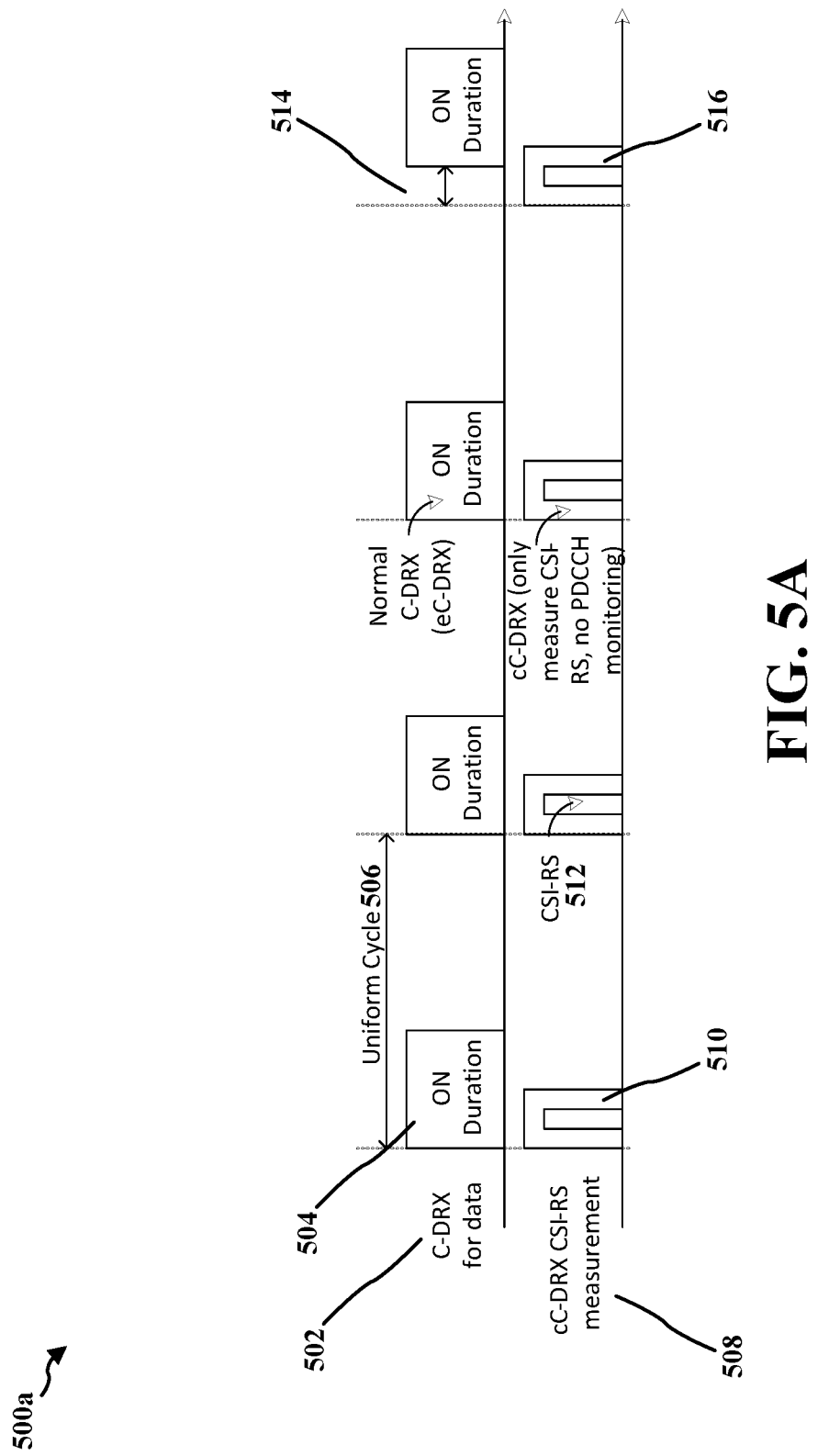
FIG. 5A is a diagram illustrating an example connected mode DRX (C-DRX) cycle and a customizable C-DRX (cC-DRX) cycle, in accordance with various aspects of the present disclosure.

FIG. 5A illustrates an example of a cC-DRX cycle and a normal C-DRX cycle. In example 500a, C-DRX cycle 502 may be configured with an on-duration 504 during a uniform cycle period 506. Moreover, a cC-DRX cycle 508 may be configured with an on-duration 510 in which the UE 104 may be indicated to only measure CSI-RS 512. As illustrated in FIG. 5, example 500a, the normal C-DRX cycle may be enhanced to account for XR traffic by moving the on-duration before or after a configured start time to account for jitter 514. However, by moving the on-duration in such manner, then a CSI-RS measurement that may be necessary for channel estimation during this jitter period may no longer be possible given that the UE 104 would generally sleep during its off duration. Thus, the customizable C-DRX may allow the UE 104 to measure CSI-RS 512 during this jitter within on-duration 516 and thus, maintain channel estimation capability. Moreover during each on-duration of the cC-DRX cycle, the UE 104 may only measure CSI-RS, and refrain from monitoring PDCCH based on such indication in the cC-DRX configuration. As a result, the UE 104 may save power by not having to monitor PDCCH unlike in the normal C-DRX cycle where the UE 104 may end up monitoring PDCCH regardless and thus utilizing unnecessary power.

Figure 5B:
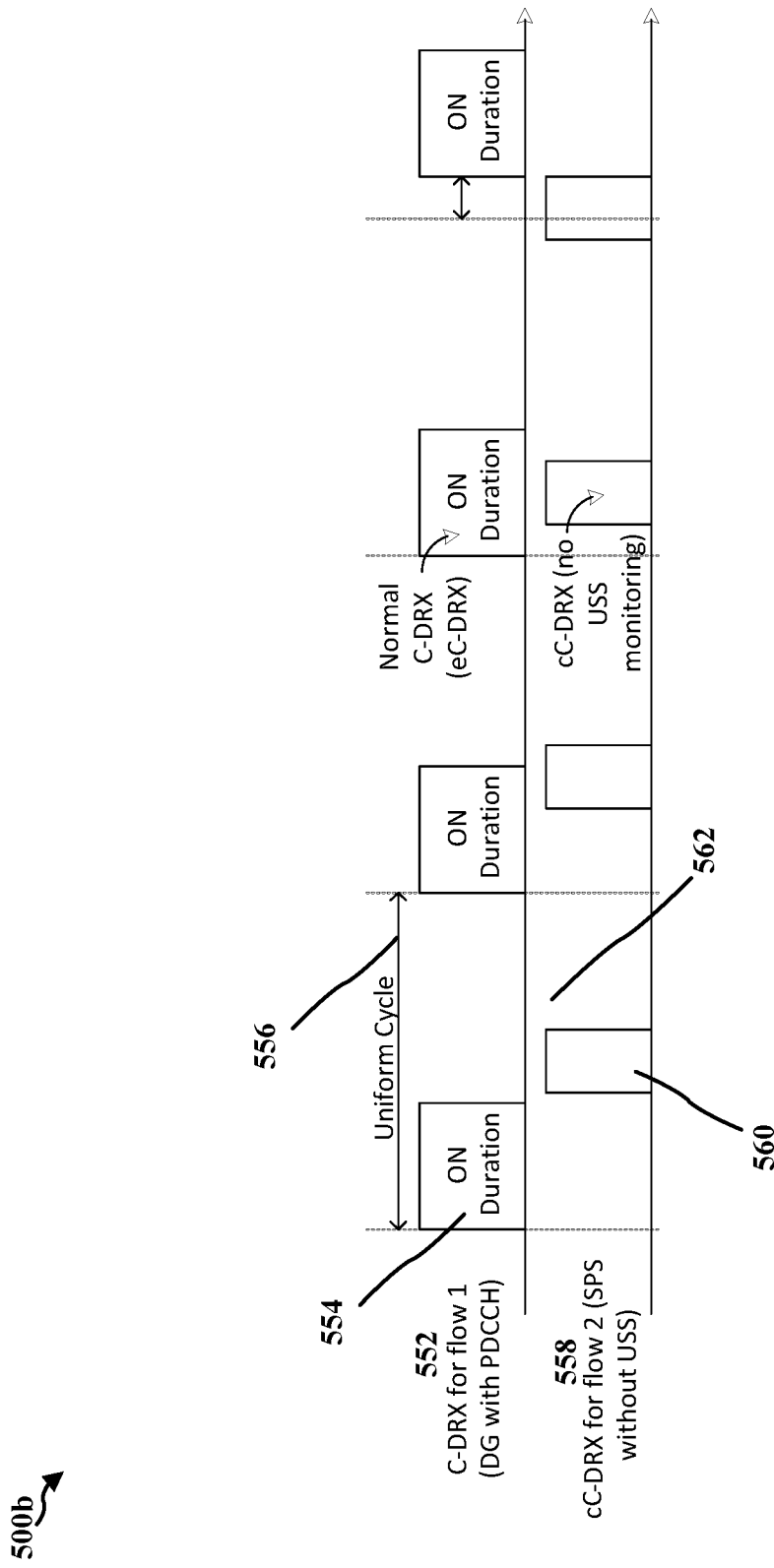
FIG. 5B is a diagram illustrating another example C-DRX cycle and a cC-DRX cycle, in accordance with various aspects of the present disclosure.

Referring to FIG. 5B, example 500b, there may be two C-DRX cycles associated with different flows of traffic, including a cC-DRX cycle and normal C-DRX cycle. A first flow 552, may include on-duration 554 within a uniform C-DRX cycle period 556, while a second flow 558 may include on-duration 560 within a non-uniform cC-DRX cycle 562. In the C-DRX cycle, the UE 104 may measure or monitor for user search space, common search space, and/or other information associated with PDCCH within the first flow 552 that may be necessary due to the flow 552 being associated with a dynamic grant (DG). However, second flow 558 may be associated with a semi persistently scheduled configuration and thus, may not have a user search space indicating a PDCCH. Therefore, if a normal C-DRX cycle, as in first flow 552, is applied for second flow 558, then the UE 104 may waste power by measuring a USS for a PDCCH that may not exist. Thus, the cC-DRX cycle in second flow 558 may allow the UE 104, based on the indication of the associated cC-DRX configuration, to refrain from monitoring the USS, and save power in connection with second flow 558 (e.g., XR traffic).

In one example a cC-DRX configuration maybe semi statically changed via an RRC message or dynamically changed via a DCI or a MAC-CE. For example, a network entity (e.g., base station 102/180) may initially configure a cC-DRX configuration that requires the UE 104 to measure CSI-RS and to refrain from monitoring PDCCH, but the network entity, in response to determining a different XR traffic flow intended for the UE 104, may dynamically indicate a different cC-DRX configuration that may require the UE 104 to monitor PDCCH but refrain from measuring CSI-RS (the reverse of the previous configuration). In another example, cC-DRX configuration may be recommended by the UE 104. For example, the UE 104 may send a request to a network entity (e.g., base station 102/180) for a cC-DRX configuration and may optionally indicate one or more parameters associated with the cC-DRX configuration, such as a preferred operation that the UE 104 may be required to perform or operations that the UE 104 may be restricted from performing. In response to this cC-DRX configuration request, the network entity may send an RRC message or a DCI or MAC-CE or other message indicating the recommended cC-DRX configuration of the UE 104.

In another example, a cC-DRX configuration maybe implicitly configured in a normal C-DRX configuration. For instance, in the previous examples a UE 104 may receive two configurations including a normal C-DRX configuration and a cC-DRX configuration. However, in this example the UE 104 may receive one configuration associated with a normal C-DRX cycle, and the configuration may include one or more information elements or other associated parameter(s) that indicates the configurations or parameters of the cC-DRX cycle. For example, the normal C-DRX configuration may indicate the UE 104 to activate its on-duration in a cC-DRX cycle before (e.g., a configured number of slots before) a start time of the C-DRX normal cycle or after (e.g., a configured number of slots after) an end time of the normal C-DRX cycle. Thus, this approach may save overhead in terms of one C-DRX configuration indicating customizable parameters for a second cC-DRX cycle where the first (normal) C-DRX cycle is also indicated in this configuration.

In a another example, a cC-DRX cycle may overlap with a normal C-DRX cycle or another cC-DRX cycle. For instance, a cC-DRX cycle may have an on-duration or active time that overlaps with an on-duration or active time of the other cC-DRX cycle. In such situation, for example, when both cC-DRX cycles are active, the UE 104 may be configured to apply one of multiple options in response. In one option, in a cC-DRX cycle, the UE 104 may apply one of the two cC-DRX cycles' rules. Therefore, for example, if the first cC-DRX cycle requires the UE 104 to measure CSI-RS, while the second cCDR-X cycle requires the UE 104 to only measure or monitor PDCCH, and the UE 104 is configured with a set of rules and/or instructions that indicate that the CSI-RS measurement will take priority in the event of such overlap, then the UE 104 may perform, in both cC-DRX cycles, only CSI-RS measurements. In other words, the UE 104 may not perform the configured operation of PDCCH monitoring for one of the cC-DRX cycles in the case of such overlap; instead, that associated cC-DRX cycle follows the rules of the other cC-DRX cycle (in this case, CSI-RS measurement).

In another example, in such case of overlap, the UE 104 may apply a union of the operations in both cC-DRX cycles. For instance, in the previous example where one of the cycles includes CSI-RS measurement, and another one of the cycles includes PDCCH monitoring, then in the cC-DRX cycle (either one), the UE 104 may apply both CSI-RS measurement and PDCCH monitoring in the active time of the cC-DRX cycle. This is because even though each cC-DRX cycle is only configured with one of these two operations, the UE 104 maybe pre-configured or configured to combine these two operations in the cC-DRX cycles, and therefore, the UE 104 may perform both configured operations within the active duration of a cC-DRX cycle.

In a further example a cC-DRX cycle may either start or end within an active time of a normal C-DRX cycle. Similarly, a cC-DRX cycle may either start or end inside the active time of another cC-DRX cycle. In such situations, the UE 104 may perform one of multiple options. In one option, the UE 104 may maintain a current configuration for its cC-DRX cycle. For example, if a cC-DRX cycle has a start time or an end time within an active time of another cC-DRX cycle the UE 104 may apply the cC-DRX cycle without any change to its configured start time or end time. In other words, the cC-DRX configuration may indicate that the start time or end time of a cC-DRX cycle will not be extended to overlap with a start time, end time, or active time of an overlapping other cC-DRX cycle. In another example, in the event of such overlap, the UE 104 may instead be configured to extend the start time or end time or, both, start time and end time, of the cC-DRX cycle to overlap with the start time, end time, or active time of the overlapping cC-DRX cycle. For example the configuration of the cC-DRX cycle may indicate the UE 104 to extend the start time and/or end time of one cC-DRX cycle to match that of another cC-DRX cycle based on such overlap.

Referring to FIG. 6, example 600 illustrates an example of a first cC-DRX cycle 602 that overlaps with a second cC-DRX cycle 604 in certain uniform cycle periods 606 and non-uniform cycle periods 607 of the cC-DRX cycles, respectively. For instance, one or more on-durations 608 of the second cC-DRX cycles 604 may not overlap with one or more on-duration 610 of the first cC-DRX cycles 602, while one or more on-durations 612 of the second cC-DRX cycle 604 may overlap at least in start time 614 and/or end time 616 with one or more on-durations 610 of the first cC-DRX cycles 602. In this example, the cC-DRX configuration may indicate the UE 104 to extend the start time and/or end time of the second cC-DRX cycle 617 to match the overlapping start time, end time and/or on-duration of the first cC-DRX cycle 602. Thus, FIG. 6 illustrates, in second cC-DRX cycles 617, that an extended portion 618 of the second cC-DRX cycle may be configured. As a result, if the UE 104 is initially configured to, for example, only measure CSI-RS within a configured on-duration of the second cC-DRX cycle 617, the UE 104 may now be indicated to measure CSI-RS outside of this configured on-duration, that is in this extended portion 618. This extended portion may extend backwards from the start time and/or forwards from the end time of the on duration of second cC-DRX cycle 617.

Referring to example 700 of FIG. 7 and FIG. 8, in operation, UE 104 may perform a method 800 of wireless communication, by such as via execution of cC-DRX component 198 by processor 705 and/or memory 360 (FIG. 3). In this case, the processor 705 may be the receive (rx) processor 356, the controller/processor 359, and/or the transmit (tx) processor 368 described above in FIG. 3.

At block 802, the method 800 includes receiving at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of CDRX cycles is associated with a subset of UE operations of the set of UE operations. For example, in an aspect, UE 104, processor 705, memory 360, cC-DRX component 198, and/or receiving component 720 may be configured to or may comprise means for receiving at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations.

For example, the receiving at block 802 may include receiving the at least one configuration associated with the plurality of C-DRX cycles. via a wireless signal at an antenna or antenna array (e.g., antenna 352) as described in FIG. 3, and processing the received wireless signal and the at least one configuration associated with the plurality of C-DRX cycles as described above.

At block 804, the method 800 includes transmitting data based on performance of one or more UE operations of the subset of UE operations during the second C-DRX cycle. For example, in an aspect, UE 104, processor 705, memory 360, cC-DRX component 198, and/or transmitting component 725 may be configured to or may comprise means for transmitting data based on performance of one or more UE operations of the subset of UE operations during the second C-DRX cycle.

For example, the transmitting at block 804 may include transmitting the data based on performance of one or more UE operations of the subset of UE operations during the second C-DRX cycle via a wireless signal at an antenna or antenna array (e.g., antenna 352) as described in FIG. 3.

Referring to FIG. 9, in an alternative or additional aspect, where the subset of UE operations includes measurement of a channel state information reference signal (CSI-RS), at block 902, the method 800 may further include refraining from monitoring a physical downlink control channel (PDCCH) during an active time of the second C-DRX cycle. For example, in an aspect, UE 104, processor 705, memory 360, cC-DRX component 198, and/or refraining component 730 may be configured to or may comprise means for transmitting data based on performance of one or more UE operations of the subset of UE operations during the second C-DRX cycle.

Referring to FIG. 10, in an alternative or additional aspect, where data associated with second C-DRX cycle is semi-persistently scheduled, at block 1002, the method 800 may further include refraining from monitoring a UE specific search space (USS) during the second C-DRX cycle. For example, in an aspect, UE 104, processor 705, memory 360, cC-DRX component 198, and/or refraining component 730 may be configured to or may comprise means for refraining from monitoring a UE specific search space (USS) during the second C-DRX cycle.

Referring to FIG. 11, in an alternative or additional aspect, at block 1102, the method 800 may further include receiving an updated configuration associated with the second C-DRX cycle, where at least one of a parameter value of the second C-DRX cycle or the subset of UE operations are modified based on the updated configuration. For example, in an aspect, UE 104, processor 705, memory 360, cC-DRX component 198, and/or receiving component 720 may be configured to or may comprise means for receiving an updated configuration associated with the second C-DRX cycle, where at least one of a parameter value of the second C-DRX cycle or the subset of UE operations are modified based on the updated configuration.

For example, the receiving at block 1102 may include receiving the updated configuration associated with the second C-DRX cycle, where at least one of a parameter value of the second C-DRX cycle or the subset of UE operations are modified based on the updated configuration via a wireless signal at an antenna or antenna array (e.g., antenna 352) as described in FIG. 3, and processing the received wireless signal and the updated configuration as described above.

In an alternative or additional aspect, the updated configuration is received via a radio resource control (RRC) message.

In an alternative or additional aspect, the updated configuration is received via a downlink control information (DCI) message.

In an alternative or additional aspect, the updated configuration is received via a medium access control control element (MAC-CE).

Figure 12:
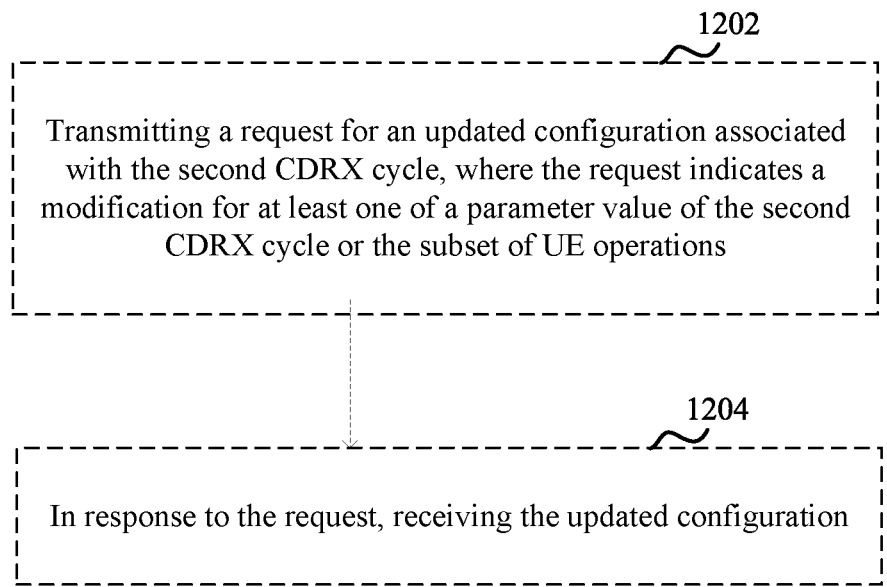
FIG. 12 is a flowchart of a method of wireless communication.

Referring to FIG. 12, in an alternative or additional aspect, at block 1202, the method 800 may further include transmitting a request for an updated configuration associated with the second CDRX cycle, where the request indicates a modification for at least one of a parameter value of the second CDRX cycle or the subset of UE operations. For example, in an aspect, UE 104, processor 705, memory 360, cC-DRX component 198, and/or transmitting component 725 may be configured to or may comprise means for transmitting a request for an updated configuration associated with the second CDRX cycle, where the request indicates a modification for at least one of a parameter value of the second CDRX cycle or the subset of UE operations.

For example, the transmitting at block 1202 may include transmitting the request for the updated configuration via a wireless signal at an antenna or antenna array (e.g., antenna 352) as described in FIG. 3.

In this optional aspect, at block 1204, the method 800 may further include, in response to the request, receiving the updated configuration. For example, in an aspect, UE 104, processor 705, memory 360, cC-DRX component 198, and/or receiving component 720 may be configured to or may comprise means for receiving the updated configuration in response to the request.

For example, the receiving at block 1204 may include receiving the updated configuration via a wireless signal at an antenna or antenna array (e.g., antenna 352) as described in FIG. 3, and processing the received wireless signal and the updated configuration as described above.

In an alternative or additional aspect, the at least one of the parameter value of the second C-DRX cycle or the subset of UE operations are modified based on the updated configuration.

Referring to FIG. 13, in an alternative or additional aspect, at block 1302, the method 800 may further include receiving an updated configuration associated with the first CDRX cycle, where at least one of a parameter value of the second CDRX cycle or the subset of UE operations are modified based on the updated configuration. For example, in an aspect, UE 104, processor 705, memory 360, cC-DRX component 198, and/or receiving component 720 may be configured to or may comprise means for receiving an updated configuration associated with the first CDRX cycle, where at least one of a parameter value of the second CDRX cycle or the subset of UE operations are modified based on the updated configuration.

For example, the receiving at block 1302 may include receiving the updated configuration via a wireless signal at an antenna or antenna array (e.g., antenna 352) as described in FIG. 3, and processing the received wireless signal and the updated configuration as described above.

Referring to FIG. 14, in an alternative or additional aspect, where the updated configuration indicates a start time of an active time for the first C-DRX cycle, at block 1402, the method 800 may further include updating a start time of an active time for the second C-DRX cycle based on the start time indicated in the updated configuration. For example, in an aspect, UE 104, processor 705, memory 360, cC-DRX component 198, and/or updating component 735 may be configured to or may comprise means for, where the updated configuration indicates a start time of an active time for the first C-DRX cycle, updating a start time of an active time for the second C-DRX cycle based on the start time indicated in the updated configuration.

In an alternative or additional aspect, the start time of the active time of the second C-DRX cycle is updated to be a threshold amount of time before a start time of the active time of the first C-DRX cycle.

Referring to FIG. 15, in an alternative or additional aspect, where the updated configuration indicates an end time of an active time for the first C-DRX cycle, at block 1502, the method 800 may further include updating a start time of an active time for the second CDRX cycle based on the end time indicated in the updated configuration. For example, in an aspect, UE 104, processor 705, memory 360, cC-DRX component 198, and/or updating component 735 may be configured to or may comprise means for, where the updated configuration indicates an end time of an active time for the first C-DRX cycle, updating a start time of an active time for the second CDRX cycle based on the end time indicated in the updated configuration.

In an alternative or additional aspect, the start time of the active time of the second C-DRX cycle is updated to be a threshold amount of time after an end time of the active time of the first C-DRX cycle.

Referring to FIG. 16, in an alternative or additional aspect, where a third C-DRX cycle of the plurality of C-DRX cycles is associated with a second subset of UE operations of the set of UE operations, the second subset of UE operations being different than the subset of UE operations, at block 16, the method 800 may further include transmitting second data based on performance of one or more UE operations of the subset of UE operations during the third C-DRX cycle, where the one or more UE operations of the subset of UE operations are performed during the third C-DRX cycle based on an active time of the second C-DRX cycle overlapping with an active time of the third C-DRX cycle. For example, in an aspect, UE 104, processor 705, memory 360, cC-DRX component 198, and/or transmitting component 725 may be configured to or may comprise means for, where a third C-DRX cycle of the plurality of C-DRX cycles is associated with a second subset of UE operations of the set of UE operations, the second subset of UE operations being different than the subset of UE operations, transmitting second data based on performance of one or more UE operations of the subset of UE operations during the third C-DRX cycle, where the one or more UE operations of the subset of UE operations are performed during the third C-DRX cycle based on an active time of the second C-DRX cycle overlapping with an active time of the third C-DRX cycle.

For example, the transmitting at block 1602 may include transmitting second data via a wireless signal at an antenna or antenna array (e.g., antenna 352) as described in FIG. 3.

In an alternative or additional aspect, a third C-DRX cycle of the plurality of C-DRX cycles is associated with a second subset of UE operations of the set of UE operations, the second subset of UE operations being different than the subset of UE operations, and the transmitted data is further based on performance of one or more UE operations of the second subset of UE operations during the second C-DRX cycle, the one or more UE operations of the second subset of UE operations being performed during the second C-DRX cycle based on an active time of the second C-DRX cycle overlapping with an active time of the third C-DRX cycle.

In an alternative or additional aspect, a third C-DRX cycle of the plurality of C-DRX cycles is associated with a second subset of UE operations of the set of UE operations, the second subset of UE operations being different than the subset of UE operations, and the at least one configuration indicates to the UE to extend a start time of an active time of the third C-DRX cycle to overlap with a start time of an active time of the second C-DRX cycle based on the start time of the active time of the third C-DRX cycle initially overlapping with the active time of the second C-DRX cycle.

In an alternative or additional aspect, a third C-DRX cycle of the plurality of C-DRX cycles is associated with a second subset of UE operations of the set of UE operations, the second subset of UE operations being different than the subset of UE operations, and the at least one configuration indicates to the UE to extend an end time of an active time of the third C-DRX cycle to overlap with an end time of an active time of the second C-DRX cycle based on the end time of the active time of the third C-DRX cycle initially overlapping with the active time of the second C-DRX cycle.

In an alternative or additional aspect, a third C-DRX cycle of the plurality of C-DRX cycles is associated with a second subset of UE operations of the set of UE operations, the second subset of UE operations being different than the subset of UE operations, a start time of the active time of the third C-DRX cycle initially overlaps with an active time of the second C-DRX cycle, and the at least one configuration indicates that the start time of the active time of the third C-DRX cycle is not extended to overlap with a start time of the active time of the second C-DRX cycle.

In an alternative or additional aspect, a third C-DRX cycle of the plurality of C-DRX cycles is associated with a second subset of UE operations of the set of UE operations, the second subset of UE operations being different than the subset of UE operations, an end time of the active time of the third C-DRX cycle initially overlaps with an active time of the second C-DRX cycle, and the at least one configuration indicates that the end time of the active time of the third C-DRX cycle is not extended to overlap with an end time of the active time of the second C-DRX cycle.

In an alternative or additional aspect, the set of UE operations comprises at least one of reception of a channel state indicator reference signal (CSI-RS), a measurement of the CSI-RS, a reception of a physical downlink control channel (PDCCH), a monitor of a common search space for the PDCCH, or a monitor of a UE specific search space for the PDCCH.

Referring to example 1700 of FIG. 17 and FIG. 18, in operation, network entity 102 may perform a method 1800 of wireless communication, by such as via execution of cC-DRX component 199 by processor 1706 and/or memory 376 (FIG. 3). In this case, the processor 1706 may be the receive (rx) processor 370, the controller/processor 375, and/or the transmit (tx) processor 316 described above in FIG. 3.

At block 1802, the method 1800 includes transmitting at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations. For example, in an aspect, network entity 102, processor 1706, memory 376, cC-DRX component 199, and/or transmitting component 1720 may be configured to or may comprise means for transmitting at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations.

For example, the transmitting at block 1802 may include transmitting the at least one configuration associated with a plurality of connected mode discontinuous reception (C-DRX) cycles via one or more wireless signals transmitted using an antenna or an antenna array (e.g., antenna 320).

At block 1804, the method 1800 includes receiving data associated with one or more UE operations of the subset of UE operations during the second C-DRX cycle. For example, in an aspect, network entity 102, processor 1706, memory 376, cC-DRX component 199, and/or receiving component 1725 may be configured to or may comprise means for receiving data associated with one or more UE operations of the subset of UE operations during the second C-DRX cycle.

For example, the receiving at block 1804 may include receiving the data via one or more wireless signals at an antenna or an antenna array (e.g., antenna 320) as described in FIG. 3, and processes the wireless signals as described in FIG. 3.

Referring to FIG. 19, in an alternative or additional aspect, at block 1902, the method 1800 may further include transmitting an updated configuration associated with the second C-DRX cycle, where at least one of a parameter value of the second C-DRX cycle or the subset of UE operations are modified based on the updated configuration. For example, in an aspect, network entity 102, processor 1706, memory 376, cC-DRX component 199, and/or transmitting component 1720 may be configured to or may comprise means for transmitting an updated configuration associated with the second C-DRX cycle, where at least one of a parameter value of the second C-DRX cycle or the subset of UE operations are modified based on the updated configuration.

For example, the transmitting at block 1802 may include transmitting the at least one configuration associated with a plurality of connected mode discontinuous reception (C-DRX) cycles via one or more wireless signals transmitted using an antenna or an antenna array (e.g., antenna 320).

Referring to FIG. 20, in an alternative or additional aspect, at block 2002, the method 1800 may further include receiving a request for an updated configuration associated with the second C-DRX cycle, where the request indicates a modification for at least one of a parameter value of the second C-DRX cycle or the subset of UE operations. For example, in an aspect, network entity 102, processor 1706, memory 376, cC-DRX component 199, and/or receiving component 1725 may be configured to or may comprise means for receiving a request for an updated configuration associated with the second C-DRX cycle, where the request indicates a modification for at least one of a parameter value of the second C-DRX cycle or the subset of UE operations.

For example, the receiving at block 2002 may include receiving the request via one or more wireless signals at an antenna or an antenna array (e.g., antenna 320) as described in FIG. 3, and processing the wireless signals as described in FIG. 3, and the request as described above.

In this optional aspect, at block 2004, the method 1800 may further include, in response to the request, transmitting the updated configuration. For example, in an aspect, network entity 102, processor 1706, memory 376, cC-DRX component 199, and/or transmitting component 1720 may be configured to or may comprise means for, in response to the request, transmitting the updated configuration.

For example, the transmitting at block 2004 may include transmitting the updated configuration via one or more wireless signals transmitted using an antenna or an antenna array (e.g., antenna 320).

Referring to FIG. 21, in an alternative or additional aspect, at block 2002, the method 1800 may further include transmitting an updated configuration associated with the first C-DRX cycle, where at least one of a parameter value of the second C-DRX cycle or the subset of UE operations are modified based on the updated configuration. For example, in an aspect, network entity 102, processor 1706, memory 376, cC-DRX component 199, and/or transmitting component 1720 may be configured to or may comprise means for transmitting an updated configuration associated with the first C-DRX cycle, where at least one of a parameter value of the second C-DRX cycle or the subset of UE operations are modified based on the updated configuration.

For example, the transmitting at block 2102 may include transmitting updated configuration associated with the first C-DRX cycle via one or more wireless signals transmitted using an antenna or an antenna array (e.g., antenna 320).

In an alternative or additional aspect, the updated configuration indicates a start time of an active time for the first C-DRX cycle.

In an alternative or additional aspect, the updated configuration indicates an end time of an active time for the first C-DRX cycle.

Referring to FIG. 22, in an alternative or additional aspect, at block 2002, the method 1800 may further include receiving second data associated with one or more UE operations of the subset of UE operations during a third C-DRX cycle, based on an active time of the second C-DRX cycle overlapping with an active time of the third C-DRX cycle. For example, in an aspect, network entity 102, processor 1706, memory 376, cC-DRX component 199, and/or receiving component 1725 may be configured to or may comprise means for receiving second data associated with one or more UE operations of the subset of UE operations during a third C-DRX cycle, based on an active time of the second C-DRX cycle overlapping with an active time of the third C-DRX cycle.

For example, the receiving at block 2202 may include receiving the second data via one or more wireless signals at an antenna or an antenna array (e.g., antenna 320) as described in FIG. 3, and processing the wireless signals as described in FIG. 3, and the second data as described above.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment, comprising: receiving at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations; and transmitting data based on performance of one or more UE operations of the subset of UE operations during the second C-DRX cycle.

Example 2 is the method of example 1, wherein the subset of UE operations includes measurement of a channel state information reference signal (CSI-RS), and the method further comprises: refraining from monitoring a physical downlink control channel (PDCCH) during an active time of the second C-DRX cycle.

Example 3 is the method of any of examples 1-2, wherein data associated with second C-DRX cycle is semi-persistently scheduled, and the method further comprises: refraining from monitoring a UE specific search space (USS) during the second C-DRX cycle.

Example 4 is the method of any of examples 1-3, further comprising: receiving an updated configuration associated with the second C-DRX cycle, wherein at least one of a parameter value of the second C-DRX cycle or the subset of UE operations are modified based on the updated configuration.

Example 5 is the method of example 4, wherein the updated configuration is received via a radio resource control (RRC) message.

Example 6 is the method of example 4, wherein the updated configuration is received via downlink control information (DCI).

Example 7 is the method of example 4, wherein the updated configuration is received via a medium access control control element (MAC-CE).

Example 8 is the method of any of examples 1-7, further comprising: transmit a request for an updated configuration associated with the second C-DRX cycle, wherein the request indicates a modification for at least one of a parameter value of the second C-DRX cycle or the subset of UE operations; and in response to the request, receive the updated configuration.

Example 9 is the method of example 8, wherein the at least one of the parameter value of the second C-DRX cycle or the subset of UE operations are modified based on the updated configuration.

Example 10 is the method of any of examples 1-9, further comprising: receiving an updated configuration associated with the first C-DRX cycle, wherein at least one of a parameter value of the second C-DRX cycle or the subset of UE operations are modified based on the updated configuration.

Example 11 is the method of example 10, wherein the updated configuration indicates a start time of an active time for the first C-DRX cycle, and the method further comprises: updating a start time of an active time for the second C-DRX cycle based on the start time indicated in the updated configuration.

Example 12 is the method of example 11, wherein the start time of the active time of the second C-DRX cycle is updated to be a threshold amount of time before a start time of the active time of the first C-DRX cycle.

Example 13 is the method of example 10, wherein the updated configuration indicates an end time of an active time for the first C-DRX cycle, and the method further comprises: updating a start time of an active time for the second C-DRX cycle based on the end time indicated in the updated configuration.

Example 14 is the method of example 13, wherein the start time of the active time of the second C-DRX cycle is updated to be a threshold amount of time after an end time of the active time of the first C-DRX cycle.

Example 15 is the method of any of examples 1-14, wherein a third C-DRX cycle of the plurality of C-DRX cycles is associated with a second subset of UE operations of the set of UE operations, the second subset of UE operations being different than the subset of UE operations, and the method further comprises: transmitting second data based on performance of one or more UE operations of the subset of UE operations during the third C-DRX cycle, wherein the one or more UE operations of the subset of UE operations are performed during the third C-DRX cycle based on an active time of the second C-DRX cycle overlapping with an active time of the third C-DRX cycle.

Example 16 is the method of any of examples 1-15, wherein a third C-DRX cycle of the plurality of C-DRX cycles is associated with a second subset of UE operations of the set of UE operations, the second subset of UE operations being different than the subset of UE operations, and wherein the transmitted data is further based on performance of one or more UE operations of the second subset of UE operations during the second C-DRX cycle, the one or more UE operations of the second subset of UE operations being performed during the second C-DRX cycle based on an active time of the second C-DRX cycle overlapping with an active time of the third C-DRX cycle.

Example 17 is the method of any of examples 1-16, wherein a third C-DRX cycle of the plurality of C-DRX cycles is associated with a second subset of UE operations of the set of UE operations, the second subset of UE operations being different than the subset of UE operations, and wherein the at least one configuration indicates to the UE to extend a start time of an active time of the third C-DRX cycle to overlap with a start time of an active time of the second C-DRX cycle based on the start time of the active time of the third C-DRX cycle initially overlapping with the active time of the second C-DRX cycle.

Example 18 is the method of any of examples 1-17, wherein a third C-DRX cycle of the plurality of C-DRX cycles is associated with a second subset of UE operations of the set of UE operations, the second subset of UE operations being different than the subset of UE operations, and wherein the at least one configuration indicates to the UE to extend an end time of an active time of the third C-DRX cycle to overlap with an end time of an active time of the second C-DRX cycle based on the end time of the active time of the third C-DRX cycle initially overlapping with the active time of the second C-DRX cycle.

Example 19 is the method of any of examples 1-18, wherein a third C-DRX cycle of the plurality of C-DRX cycles is associated with a second subset of UE operations of the set of UE operations, the second subset of UE operations being different than the subset of UE operations, wherein a start time of the active time of the third C-DRX cycle initially overlaps with an active time of the second C-DRX cycle; and wherein the at least one configuration indicates that the start time of the active time of the third C-DRX cycle is not extended to overlap with a start time of the active time of the second C-DRX cycle.

Example 20 is the method of any of examples 1-19, wherein a third C-DRX cycle of the plurality of C-DRX cycles is associated with a second subset of UE operations of the set of UE operations, the second subset of UE operations being different than the subset of UE operations, wherein an end time of the active time of the third C-DRX cycle initially overlaps with an active time of the second C-DRX cycle, and wherein the at least one configuration indicates that the end time of the active time of the third C-DRX cycle is not extended to overlap with an end time of the active time of the second C-DRX cycle.

Example 21 is the method of any of examples 1-20, wherein the set of UE operations comprises at least one of: reception of a channel state indicator reference signal (CSI-RS); a measurement of the CSI-RS; a reception of a physical downlink control channel (PDCCH); a monitor of a common search space for the PDCCH; or a monitor of a UE specific search space for the PDCCH.

Example 22 is a method of wireless communication at a network entity, comprising: transmitting at least one configuration associated with a plurality of connected mode discontinuous reception (C-DRX) cycles, where a first C-DRX cycle of the plurality of C-DRX cycles is associated with a set of user equipment (UE) operations and a second C-DRX cycle of the plurality of C-DRX cycles is associated with a subset of UE operations of the set of UE operations; and receive data associated with one or more UE operations of the subset of UE operations during the second C-DRX cycle.

Example 23 is the method of example 22, further comprising: transmitting an updated configuration associated with the second C-DRX cycle, wherein at least one of a parameter value of the second C-DRX cycle or the subset of UE operations are modified based on the updated configuration.

Example 24 is the method of any of examples 22-23, further comprising: receive a request for an updated configuration associated with the second C-DRX cycle, wherein the request indicates a modification for at least one of a parameter value of the second C-DRX cycle or the subset of UE operations; and in response to the request, transmit the updated configuration.

Example 25 is the method of any of examples 22-24, further comprising: transmitting an updated configuration associated with the first C-DRX cycle, wherein at least one of a parameter value of the second C-DRX cycle or the subset of UE operations are modified based on the updated configuration.

Example 26 is the method of example 25, wherein the updated configuration indicates a start time of an active time for the first C-DRX cycle.

Example 27 is the method of example 25, wherein the updated configuration indicates an end time of an active time for the first C-DRX cycle.

Example 28 is the method of any of examples 22-27, further comprising: receiving second data associated with one or more UE operations of the subset of UE operations during a third C-DRX cycle, based on an active time of the second C-DRX cycle overlapping with an active time of the third C-DRX cycle.

Example 29 is an apparatus for wireless communications, comprising means for performing a method in accordance with any one of examples 1-21.

Example 30 is an apparatus for wireless communications, comprising means for performing a method in accordance with any one of examples 22-28.

Example 31 is a non-transitory computer-readable medium comprising instructions that, when executed by an apparatus, causes the apparatus to perform a method in accordance with any one of examples 1-21.

Example 32 is a non-transitory computer-readable medium comprising instructions that, when executed by an apparatus, cause the apparatus to perform a method in accordance with any one of examples 22-28.

Example 33 is an apparatus for wireless communications, comprising: a memory comprising instructions; and one or more processors configured to execute the instructions to cause the apparatus to perform a method in accordance with any one of examples 1-21.

Example 34 is apparatus for wireless communications, comprising: a memory comprising instructions; and one or more processors configured to execute the instructions to cause the apparatus to perform a method in accordance with any one of examples 22-28.

What is claimed is:

1. An apparatus for wireless communication, comprising:
a processor;
memory coupled with the processor; and
instructions stored in the memory, when executed by the processor, cause the apparatus to:
receive at least one configuration associated with a plurality of connected mode discontinuous reception (C-DRX) cycles, wherein a first C-DRX cycle of the plurality of C-DRX cycles is associated with a set of user equipment (UE) operations corresponding to physical downlink control channel (PDCCH) monitoring and a second C-DRX cycle of the plurality of C-DRX cycles is associated with a subset of UE operations of the set of UE operations corresponding to non-PDCCH monitoring, wherein data associated with the first C-DRX cycle is scheduled using dynamic grant scheduling and data associated with the second C-DRX cycle is scheduled using configured grant scheduling; and transmit data based on performance of one or more UE operations of the subset of UE operations during the second C-DRX cycle.

2. The apparatus of claim 1, wherein the subset of UE operations includes measurement of a channel state information reference signal (CSI-RS), and wherein the instructions, when executed by the processor, further cause the apparatus to:
refrain from monitoring a physical downlink control channel (PDCCH) during an active time of the second C-DRX cycle.

3. The apparatus of claim 1, wherein data associated with second C-DRX cycle is semi-persistently scheduled, and wherein the instructions, when executed by the processor, further cause the apparatus to:
refrain from monitoring a UE specific search space (USS) during the second C-DRX cycle.

4. The apparatus of claim 1, wherein the instructions, when executed by the processor, further cause the apparatus to:
receive an updated configuration associated with the second C-DRX cycle, wherein at least one of a parameter value of the second C-DRX cycle or the subset of UE operations are modified based on the updated configuration.

5. The apparatus of claim 4, wherein the updated configuration is received via a radio resource control (RRC) message.

6. The apparatus of claim 4, wherein the updated configuration is received via downlink control information (DCI).

7. The apparatus of claim 4, wherein the updated configuration is received via a medium access control control element (MAC-CE).

8. The apparatus of claim 1, wherein the instructions, when executed by the processor, further cause the apparatus to:
transmit a request for an updated configuration associated with the second C-DRX cycle, wherein the request indicates a modification for at least one of a parameter value of the second C-DRX cycle or the subset of UE operations; and
in response to the request, receive the updated configuration.

9. The apparatus of claim 8, wherein the at least one of the parameter value of the second C-DRX cycle or the subset of UE operations are modified based on the updated configuration.

10. The apparatus of claim 1, wherein the instructions, when executed by the processor, further cause the apparatus to:
receive an updated configuration associated with the first C-DRX cycle, wherein at least one of a parameter value of the second C-DRX cycle or the subset of UE operations are modified based on the updated configuration.

11. The apparatus of claim 10, wherein the updated configuration indicates a start time of an active time for the first C-DRX cycle, and wherein the instructions, when executed by the processor, further cause the apparatus to:
update a start time of an active time for the second C-DRX cycle based on the start time indicated in the updated configuration.

12. The apparatus of claim 11, wherein the start time of the active time of the second C-DRX cycle is updated to be a threshold amount of time before a start time of the active time of the first C-DRX cycle.

13. The apparatus of claim 10, wherein the updated configuration indicates an end time of an active time for the first C-DRX cycle, and wherein the instructions, when executed by the processor, further cause the apparatus to:
update a start time of an active time for the second C-DRX cycle based on the end time indicated in the updated configuration.

14. The apparatus of claim 13, wherein the start time of the active time of the second C-DRX cycle is updated to be a threshold amount of time after an end time of the active time of the first C-DRX cycle.

15. The apparatus of claim 1, wherein a third C-DRX cycle of the plurality of C-DRX cycles is associated with a second subset of UE operations of the set of UE operations, the second subset of UE operations being different than the subset of UE operations, and wherein the instructions, when executed by the processor, further cause the apparatus to:
transmit second data based on performance of one or more UE operations of the subset of UE operations during the third C-DRX cycle, wherein the one or more UE operations of the subset of UE operations are performed during the third C-DRX cycle based on an active time of the second C-DRX cycle overlapping with an active time of the third C-DRX cycle.

16. The apparatus of claim 1, wherein a third C-DRX cycle of the plurality of C-DRX cycles is associated with a second subset of UE operations of the set of UE operations, the second subset of UE operations being different than the subset of UE operations, and
wherein the transmitted data is further based on performance of one or more UE operations of the second subset of UE operations during the second C-DRX cycle, the one or more UE operations of the second subset of UE operations being performed during the second C-DRX cycle based on an active time of the second C-DRX cycle overlapping with an active time of the third C-DRX cycle.

17. The apparatus of claim 1, wherein a third C-DRX cycle of the plurality of C-DRX cycles is associated with a second subset of UE operations of the set of UE operations, the second subset of UE operations being different than the subset of UE operations, and
wherein the at least one configuration indicates to the UE to extend a start time of an active time of the third C-DRX cycle to overlap with a start time of an active time of the second C-DRX cycle based on the start time of the active time of the third C-DRX cycle initially overlapping with the active time of the second C-DRX cycle.

18. The apparatus of claim 1, wherein a third C-DRX cycle of the plurality of C-DRX cycles is associated with a second subset of UE operations of the set of UE operations, the second subset of UE operations being different than the subset of UE operations, and
wherein the at least one configuration indicates to the UE to extend an end time of an active time of the third C-DRX cycle to overlap with an end time of an active time of the second C-DRX cycle based on the end time of the active time of the third C-DRX cycle initially overlapping with the active time of the second C-DRX cycle.

19. The apparatus of claim 1, wherein a third C-DRX cycle of the plurality of C-DRX cycles is associated with a second subset of UE operations of the set of UE operations, the second subset of UE operations being different than the subset of UE operations, wherein a start time of the active time of the third C-DRX cycle initially overlaps with an active time of the second C-DRX cycle; and wherein the at least one configuration indicates that the start time of the active time of the third C-DRX cycle is not extended to overlap with a start time of the active time of the second C-DRX cycle.

20. The apparatus of claim 1, wherein a third C-DRX cycle of the plurality of C-DRX cycles is associated with a second subset of UE operations of the set of UE operations, the second subset of UE operations being different than the subset of UE operations, wherein an end time of the active time of the third C-DRX cycle initially overlaps with an active time of the second C-DRX cycle, and wherein the at least one configuration indicates that the end time of the active time of the third C-DRX cycle is not extended to overlap with an end time of the active time of the second C-DRX cycle.

21. The apparatus of claim 1, wherein the set of UE operations further comprises at least one of:

a reception of a physical downlink control channel (PDCCH);

a monitor of a common search space for the PDCCH; or a monitor of a UE specific search space for the PDCCH.

22. An apparatus for wireless communication, comprising:

a processor;

memory coupled with the processor; and instructions stored in the memory, when executed by the processor, cause the apparatus to:

transmit at least one configuration associated with a plurality of connected mode discontinuous reception (C-DRX) cycles, wherein a first C-DRX cycle of the plurality of C-DRX cycles is associated with a set of user equipment (UE) operations corresponding to physical downlink control channel (PDCCH) monitoring and a second C-DRX cycle of the plurality of C-DRX cycles is associated with a subset of UE operations of the set of UE operations corresponding to non-PDCCH monitoring, wherein data associated with the first C-DRX cycle is scheduled using dynamic grant scheduling and data associated with the second C-DRX cycle is scheduled using configured grant scheduling; and receive data associated with one or more UE operations of the subset of UE operations during the second C-DRX cycle.

23. The apparatus of claim 22, wherein the instructions, when executed by the processor, further cause the apparatus to:

transmit an updated configuration associated with the second C-DRX cycle, wherein at least one of a parameter value of the second C-DRX cycle or the subset of UE operations are modified based on the updated configuration.

24. The apparatus of claim 22, wherein the instructions, when executed by the processor, further cause the apparatus to:

receive a request for an updated configuration associated with the second C-DRX cycle, wherein the request indicates a modification for at least one of a parameter value of the second C-DRX cycle or the subset of UE operations; and in response to the request, transmit the updated configuration.

25. The apparatus of claim 22, wherein the instructions, when executed by the processor, further cause the apparatus to:

transmit an updated configuration associated with the first C-DRX cycle, wherein at least one of a parameter value of the second C-DRX cycle or the subset of UE operations are modified based on the updated configuration.

26. The apparatus of claim 25, wherein the updated configuration indicates a start time of an active time for the first C-DRX cycle.

27. The apparatus of claim 25, wherein the updated configuration indicates an end time of an active time for the first C-DRX cycle.

28. The apparatus of claim 22, wherein the instructions, when executed by the processor, further cause the apparatus to:

receive second data associated with one or more UE operations of the subset of UE operations during a third C-DRX cycle, based on an active time of the second C-DRX cycle overlapping with an active time of the third C-DRX cycle.

29. A method of wireless communication at a user equipment (UE), comprising:

receiving at least one configuration associated with a plurality of connected mode discontinuous reception (C-DRX) cycles, wherein a first C-DRX cycle of the plurality of C-DRX cycles is associated with a set of user equipment (UE) operations corresponding to physical downlink control channel (PDCCH) monitoring and a second C-DRX cycle of the plurality of C-DRX cycles is associated with a subset of UE operations of the set of UE operations corresponding to non-PDCCH monitoring, wherein data associated with the first C-DRX cycle is scheduled using dynamic grant scheduling and data associated with the second C-DRX cycle is scheduled using configured grant scheduling; and transmitting data based on performance of one or more UE operations of the subset of UE operations during the second C-DRX cycle.

30. A method of wireless communication at a network entity, comprising:

transmitting at least one configuration associated with a plurality of connected mode discontinuous reception (C-DRX) cycles, wherein a first C-DRX cycle of the plurality of C-DRX cycles is associated with a set of user equipment (UE) operations corresponding to physical downlink control channel (PDCCH) monitoring and a second C-DRX cycle of the plurality of C-DRX cycles is associated with a subset of UE operations of the set of UE operations corresponding to non-PDCCH monitoring, wherein data associated with the first C-DRX cycle is scheduled using dynamic grant scheduling and data associated with the second C-DRX cycle is scheduled using configured grant scheduling; and receiving data associated with one or more UE operations of the subset of UE operations during the second C-DRX cycle.

* * * * *